United States Patent
Kang et al.

(10) Patent No.: US 10,033,448 B2
(45) Date of Patent: *Jul. 24, 2018

(54) METHOD AND APPARATUS FOR PROVIDING CONTROL INFORMATION FOR FRACTIONAL BEAMFORMING IN A WIRELESS COMMUNICATION SYSTEM

(71) Applicant: LG ELECTRONICS INC., Seoul (KR)

(72) Inventors: Jiwon Kang, Anyang-si (KR); Kilbom Lee, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

This patent is subject to a terminal disclaimer.

(21) Appl. No.: 14/781,862

(22) PCT Filed: Dec. 19, 2013

(86) PCT No.: PCT/KR2013/011879
§ 371 (c)(1),
(2) Date: Oct. 1, 2015

(87) PCT Pub. No.: WO2014/168319
PCT Pub. Date: Oct. 16, 2014

(65) Prior Publication Data
US 2016/0050001 A1    Feb. 18, 2016

Related U.S. Application Data

(60) Provisional application No. 61/809,833, filed on Apr. 8, 2013, provisional application No. 61/812,214, filed
(Continued)

(51) Int. Cl.
*H04B 7/06* (2006.01)
*H04B 7/0417* (2017.01)
(Continued)

(52) U.S. Cl.
CPC ......... *H04B 7/0617* (2013.01); *H04B 7/0421* (2013.01); *H04B 7/0456* (2013.01);
(Continued)

(58) Field of Classification Search
CPC ... H05L 5/0057; H04B 7/0456; H04B 7/0413; H04B 7/0617; H04B 7/0626; H04B 7/063; H04B 7/0634; H04W 24/10
See application file for complete search history.

(56) References Cited

U.S. PATENT DOCUMENTS

| 8,494,033 B2* | 7/2013 | Jongren | H04B 7/0617 375/219 |
| 8,498,356 B2* | 7/2013 | Clerckx | H04B 7/0639 370/210 |

(Continued)

FOREIGN PATENT DOCUMENTS

| CN | 102273091 | 12/2011 |
| EP | 2665203 | 11/2013 |

(Continued)

OTHER PUBLICATIONS

PCT International Application No. PCT/KR2013/011879, Written Opinion of the International Searching Authority dated Mar. 21, 2014, 9 pages.
(Continued)

*Primary Examiner* — Wutchung Chu
(74) *Attorney, Agent, or Firm* — Lee, Hong, Degerman, Kang & Waimey

(57) ABSTRACT

A method and apparatus for performing fractional beamforming using a massive antenna array at a Base Station
(Continued)

(BS) in a wireless communication system are disclosed. The method includes dividing the massive antenna array into partitions by rows or by columns, transmitting control information for the fractional beamforming to a User Equipment (UE), receiving feedback information based on the control information from the UE, and transmitting a signal to the UE by performing beamforming using sub-precoders for the partitions and a linking precoder that links the partitions. The control information includes at least one of information about the partitions, information about pilot patterns corresponding to the partitions, information about the linking precoder, and information indicating whether the partitions belong to the same transmission point.

12 Claims, 16 Drawing Sheets

Related U.S. Application Data on Apr. 15, 2013, provisional application No. 61/815,700, filed on Apr. 24, 2013.

(51) Int. Cl.
 *H04B 7/0456* (2017.01)
 *H04W 72/04* (2009.01)

(52) U.S. Cl.
 CPC ............ *H04B 7/063* (2013.01); *H04B 7/068* (2013.01); *H04B 7/0619* (2013.01); *H04B 7/0632* (2013.01); *H04B 7/0684* (2013.01); *H04W 72/0406* (2013.01)

(56) References Cited

U.S. PATENT DOCUMENTS

| | | | | |
|---|---|---|---|---|
| 8,831,125 B2* | 9/2014 | Wernersson | ............ | H01Q 3/00 375/242 |
| 8,885,749 B2* | 11/2014 | Wernersson | ......... | H04B 7/0617 370/328 |
| 9,031,148 B2* | 5/2015 | Wernersson | ......... | H04B 7/0617 370/328 |
| 9,161,241 B2* | 10/2015 | Thomas | ................ | H04W 24/02 |
| 9,166,849 B2* | 10/2015 | Chen | ...................... | H04B 7/024 |
| 9,236,916 B2* | 1/2016 | Wernersson | ........... | H04B 7/024 |
| 9,331,386 B2* | 5/2016 | Wernersson | ............. | H01Q 3/00 |
| 2003/0133524 A1 | 7/2003 | Miller et al. | | |
| 2006/0034279 A1* | 2/2006 | Cho | ...................... | H04B 7/0617 370/390 |
| 2007/0049347 A1 | 3/2007 | Jin et al. | | |
| 2009/0322613 A1 | 12/2009 | Bala et al. | | |
| 2010/0158151 A1 | 6/2010 | Krauss et al. | | |
| 2011/0205930 A1 | 8/2011 | Rahman et al. | | |
| 2011/0243098 A1 | 10/2011 | Koivisto et al. | | |
| 2011/0274188 A1* | 11/2011 | Sayana | ................ | H04B 7/0639 375/260 |
| 2012/0287978 A1* | 11/2012 | O'Keeffe | ............. | H01Q 21/245 375/222 |
| 2013/0057432 A1 | 3/2013 | Rajagopal et al. | | |
| 2013/0070621 A1 | 3/2013 | Marzetta et al. | | |
| 2013/0259151 A1* | 10/2013 | Thomas | ............ | H04L 25/03949 375/267 |
| 2014/0098689 A1* | 4/2014 | Lee | ...................... | H04B 7/0469 370/252 |
| 2014/0177744 A1* | 6/2014 | Krishnamurthy | .... | H04B 7/0469 375/267 |
| 2015/0078472 A1* | 3/2015 | Vook | .................... | H04B 7/0617 375/267 |
| 2016/0080052 A1* | 3/2016 | Li | ........................ | H04B 7/0456 375/267 |

FOREIGN PATENT DOCUMENTS

| | | |
|---|---|---|
| JP | 1995-087011 | 3/1995 |
| JP | 2011004212 | 1/2011 |
| JP | 2013042341 | 2/2013 |
| WO | 2013000260 | 1/2013 |
| WO | 2013024350 | 2/2013 |

OTHER PUBLICATIONS

Alcatel-Lucent Shanghai Bell, "Considerations on CSI feedback enhancements for high-priority antenna configurations," 3GPP TSG-RAN WG1 #66, R1-112420, Aug. 2011, 7 pages.

European Patent Office Application Serial No. 13881708.5, Search Report dated Dec. 20, 2016, 9 pages.

State Intellectual Property Office of the People's Republic of China Application Serial No. 201380075386.6, Office Action dated Sep. 29, 2017, 13 pages.

* cited by examiner

FIG. 2
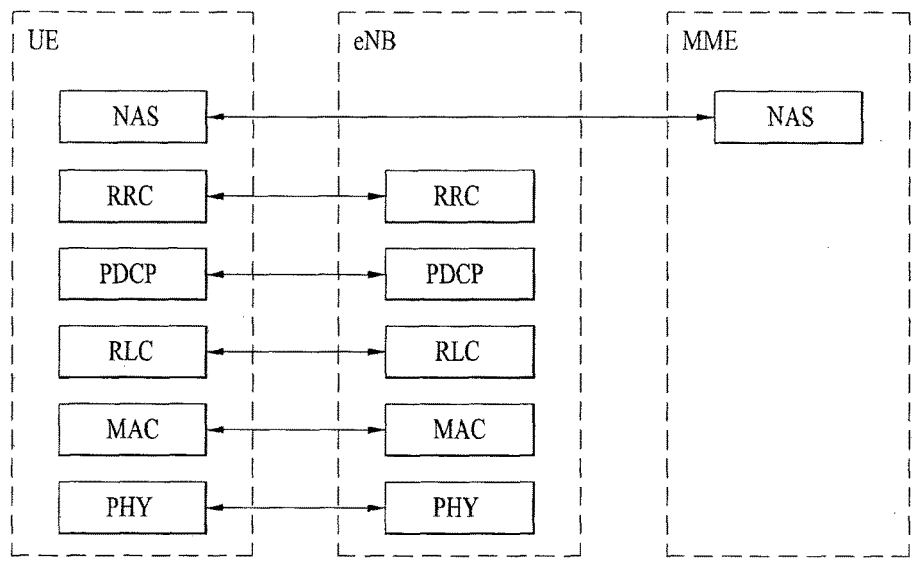
(A) CONTROL-PLANE PROTOCOL STACK
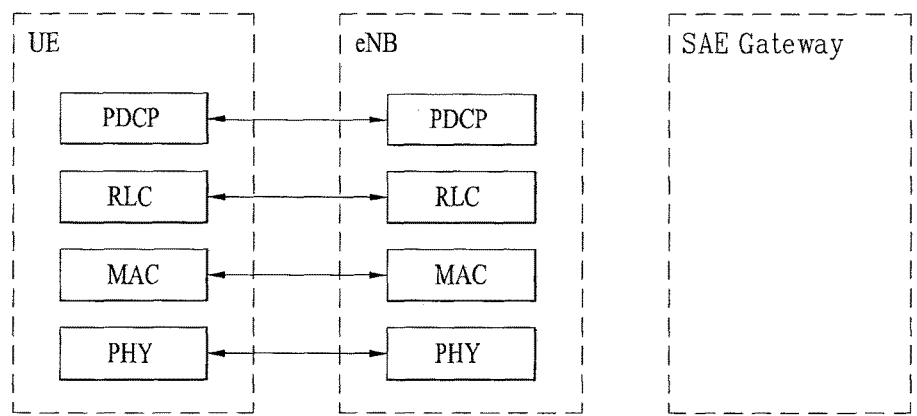
(B) USER-PLANE PROTOCOL STACK

▨ : DMRS GROUP 1

▧ : DMRS GROUP 2

(a) CONVENTIONAL ANTENNA SYSTEM
-- Prior Art--

(b) AAS

Partition 1          Partition Nt_h

METHOD AND APPARATUS FOR PROVIDING CONTROL INFORMATION FOR FRACTIONAL BEAMFORMING IN A WIRELESS COMMUNICATION SYSTEM

CROSS-REFERENCE TO RELATED APPLICATIONS

This application is the National Stage filing under 35 U.S.C. 371 of International Application No. PCT/KR2013/011879, filed on Dec. 19, 2013, which claims the benefit of U.S. Provisional Application Nos. 61/809,833, filed on Apr. 8, 2013, 61/812,214, filed on Apr. 15, 2013 and 61/815,700, filed on Apr. 24, 2013, the contents of which are all hereby incorporated by reference herein in their entirety.

TECHNICAL FIELD

The present invention relates to a wireless communication system, and more particularly, to a method and apparatus for providing control information for fractional beamforming in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARM) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for providing control information for fractional beamforming in a wireless communication system.

Technical Solution

The object of the present invention can be achieved by providing a method for performing fractional beamforming using a massive antenna array at a Base Station (BS) in a wireless communication system, including dividing the massive antenna array into partitions by rows or by columns, transmitting control information for the fractional beamforming to a User Equipment (UE), receiving feedback information based on the control information from the UE, and transmitting a signal to the UE by performing beamforming using sub-precoders for the partitions and a linking precoder that links the partitions. The control information includes at least one of information about the partitions, information about pilot patterns corresponding to the partitions, information about the linking precoder, and information indicating whether the partitions belong to the same transmission point.

In another aspect of the present invention, provided herein is a transmission apparatus for performing fractional beamforming using a massive antenna array in a wireless communication system, including a wireless communication module configured to transmit and receive a signal to and from a reception apparatus, and a processor configured to divide the massive antenna array into partitions by rows or by columns, to receive feedback information from the reception apparatus, and to perform beamforming using sub-precoders for the partitions and a linking precoder that links the partitions. The feedback information is generated based on control information transmitted previously to the reception apparatus by the transmission apparatus, and the control information includes at least one of information about the partitions, information about pilot patterns corresponding to the partitions, information about the linking precoder, and information indicating whether the partitions belong to the same transmission point.

In the above embodiments of the present invention, the control information may further include information indicating whether the fractional beamforming is applied.

The control information may include information indicating one of feedback information configuration modes, and the feedback information configuration modes may be a first mode of including information about at least one of the sub-precoders in the feedback information, a second mode of including the information about the linking precoder in the feedback information, and a third mode of not including the information about the sub-precoders and the information about the linking precoder. In this case, the feedback information may include a Channel Quality Indicator (CQI) and a Rank Indicator (RI) that are determined based on an aggregate of the pilot patterns.

If the massive antenna array is divided into the partitions by columns, vertical beamforming may be performed using the sub-precoders and horizontal beamforming may be performed using the linking precoder. Or if the massive antenna array is divided into the partitions by rows, horizontal beamforming may be performed using the sub-precoders and vertical beamforming may be performed using the linking precoder.

One of the sub-precoders and the linking precoder may be determined based on the feedback information.

Advantageous Effects

According to embodiments of the present invention, fractional beamforming can be efficiently performed in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

BEST MODE

Figure 1:
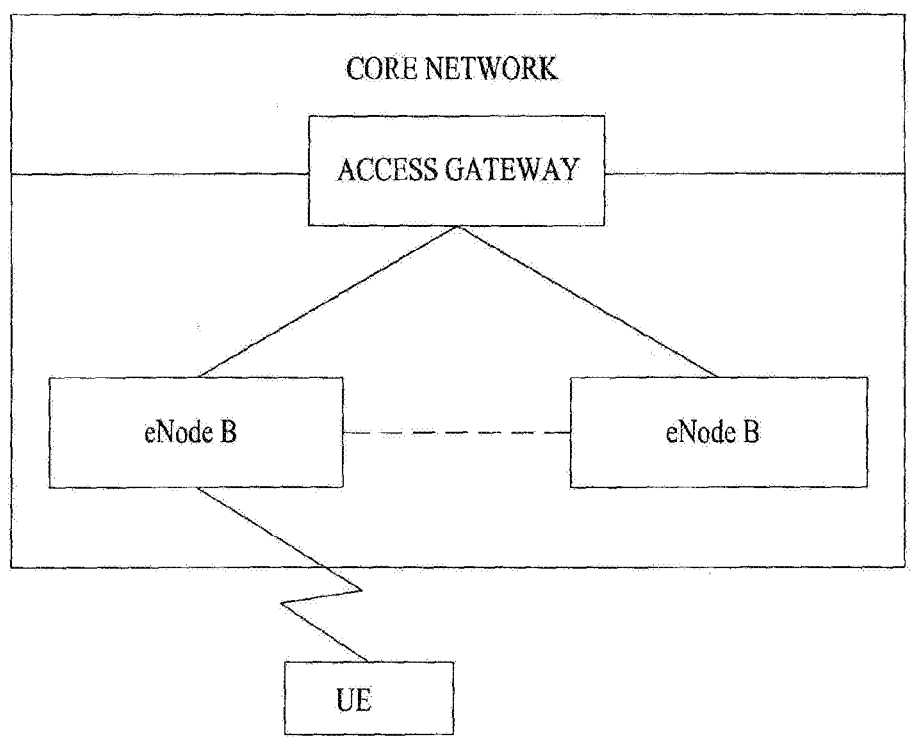
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
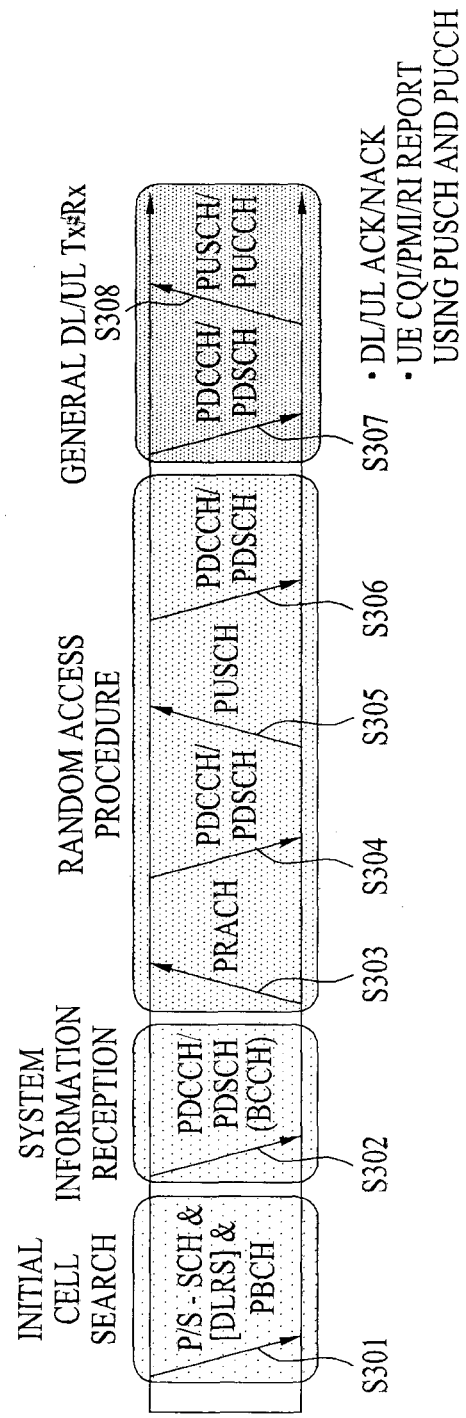
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
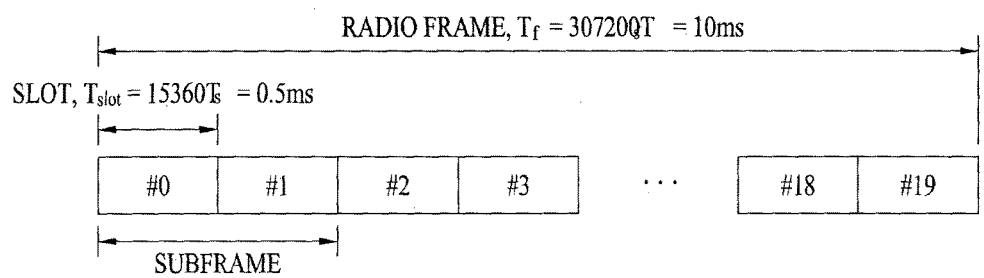
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
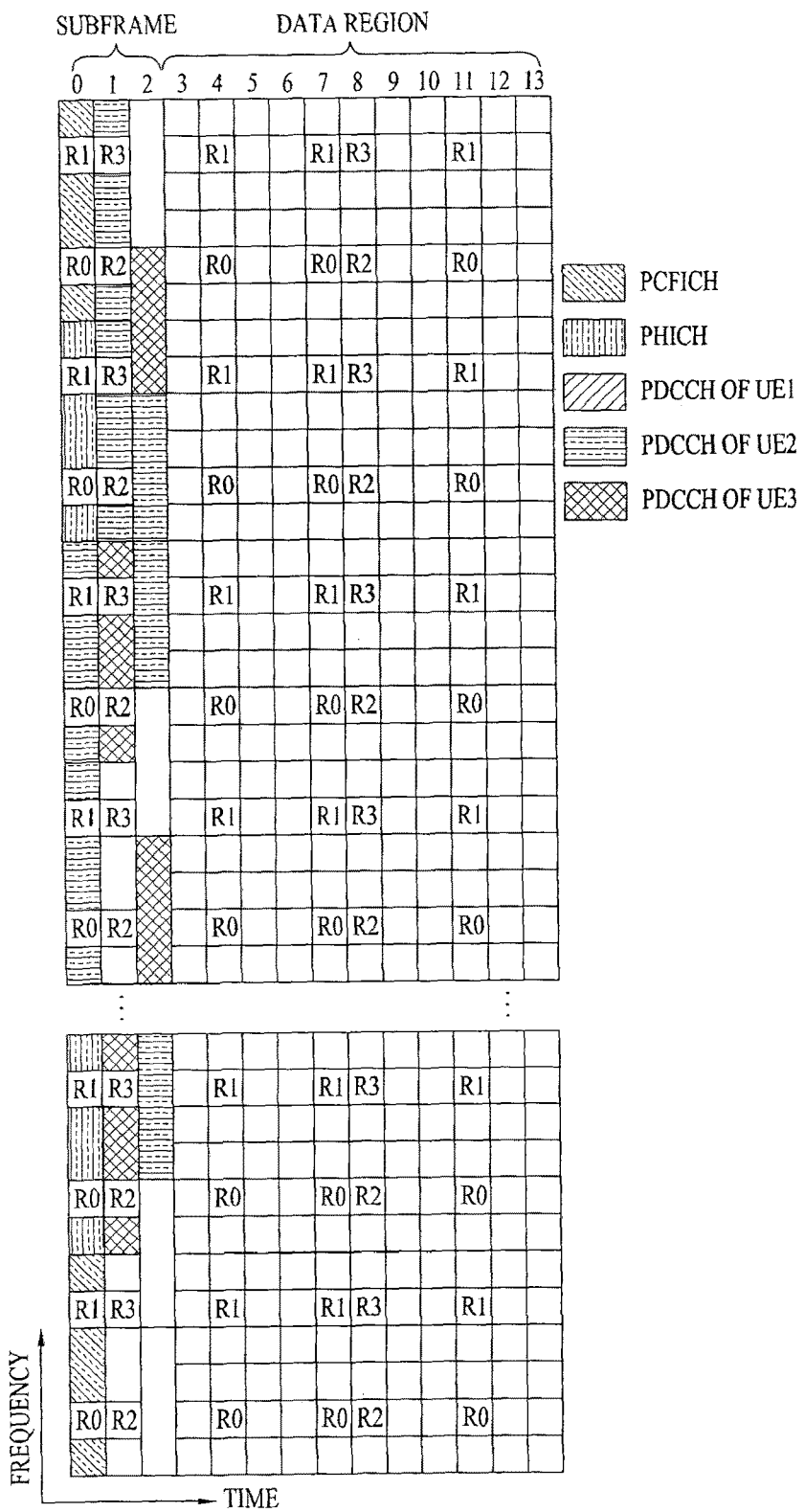
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
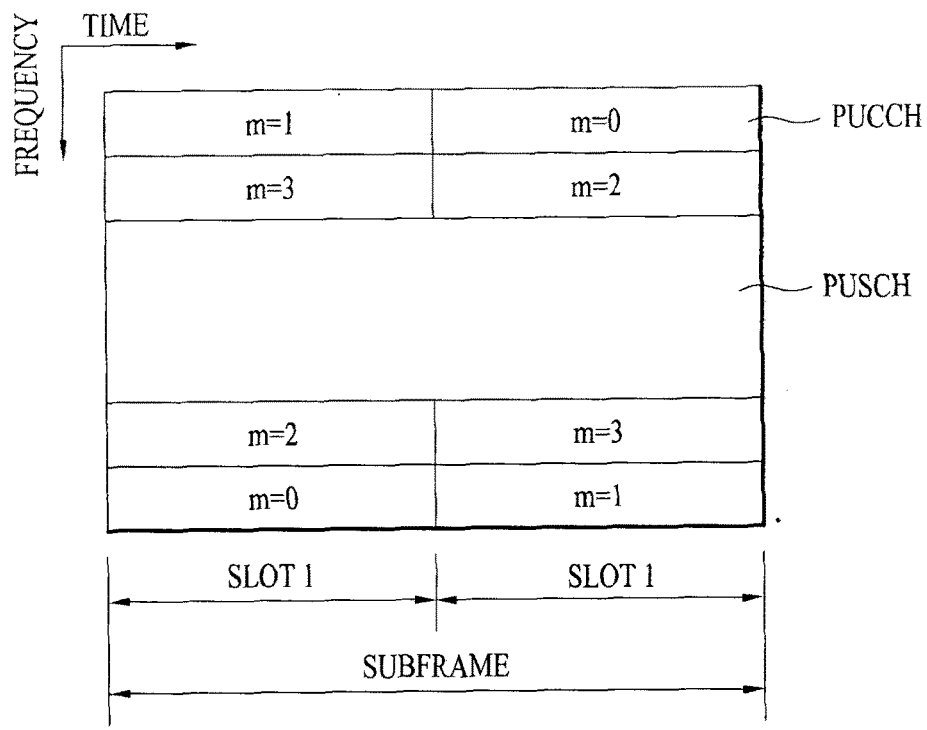
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
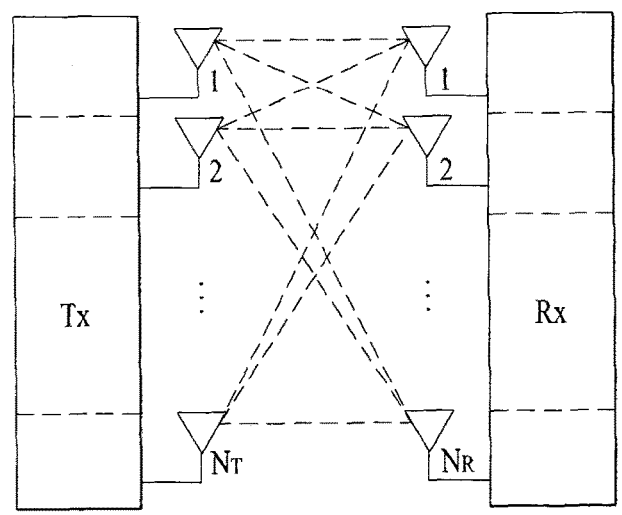
FIG. 7 illustrates a configuration of a general Multiple Input Multiple Output (MIMO) communication system.

FIG. 7 illustrates the configuration of a typical MIMO communication system. Referring to FIG. 7, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R) \quad \text{[Equation 6]}$$

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
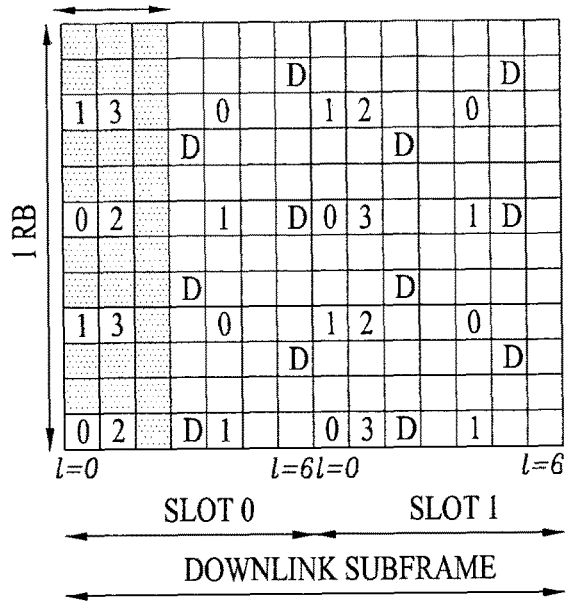
FIGS. 8 and 9 illustrate downlink Reference Signal (RS) configurations in an LTE system supporting downlink transmission through four antennas (4-Tx downlink transmission)
Figure 9:
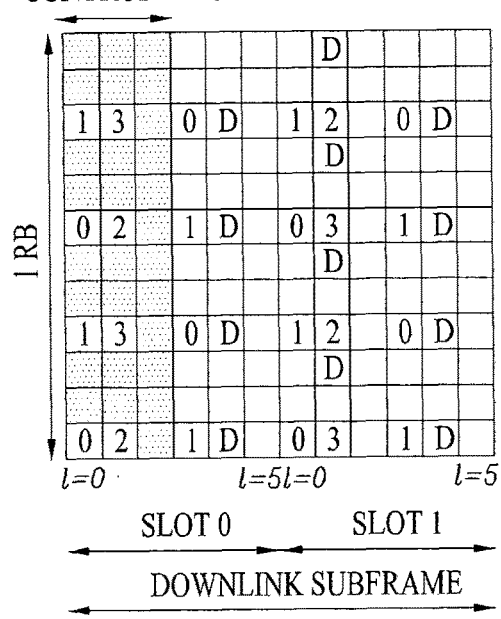

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
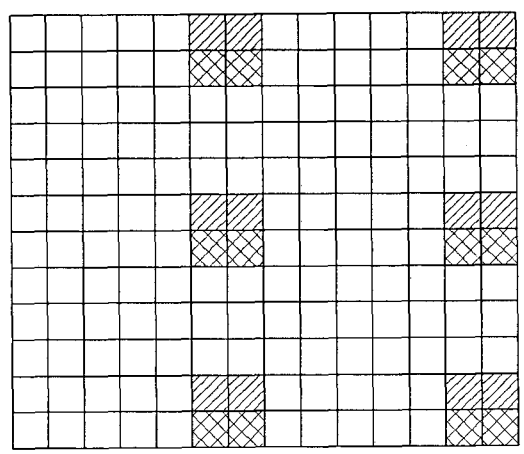
FIG. 10 illustrates an exemplary downlink Demodulation Reference Signal (DMRS) allocation defined in a current 3GPP standard specification.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | | Number of CSI reference signals configured | | | | | |
|---|---|---|---|---|---|---|---|
| CSI reference signal | | 1 or 2 | | 4 | | 8 | |
| | Configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |

TABLE 2-continued

| | | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
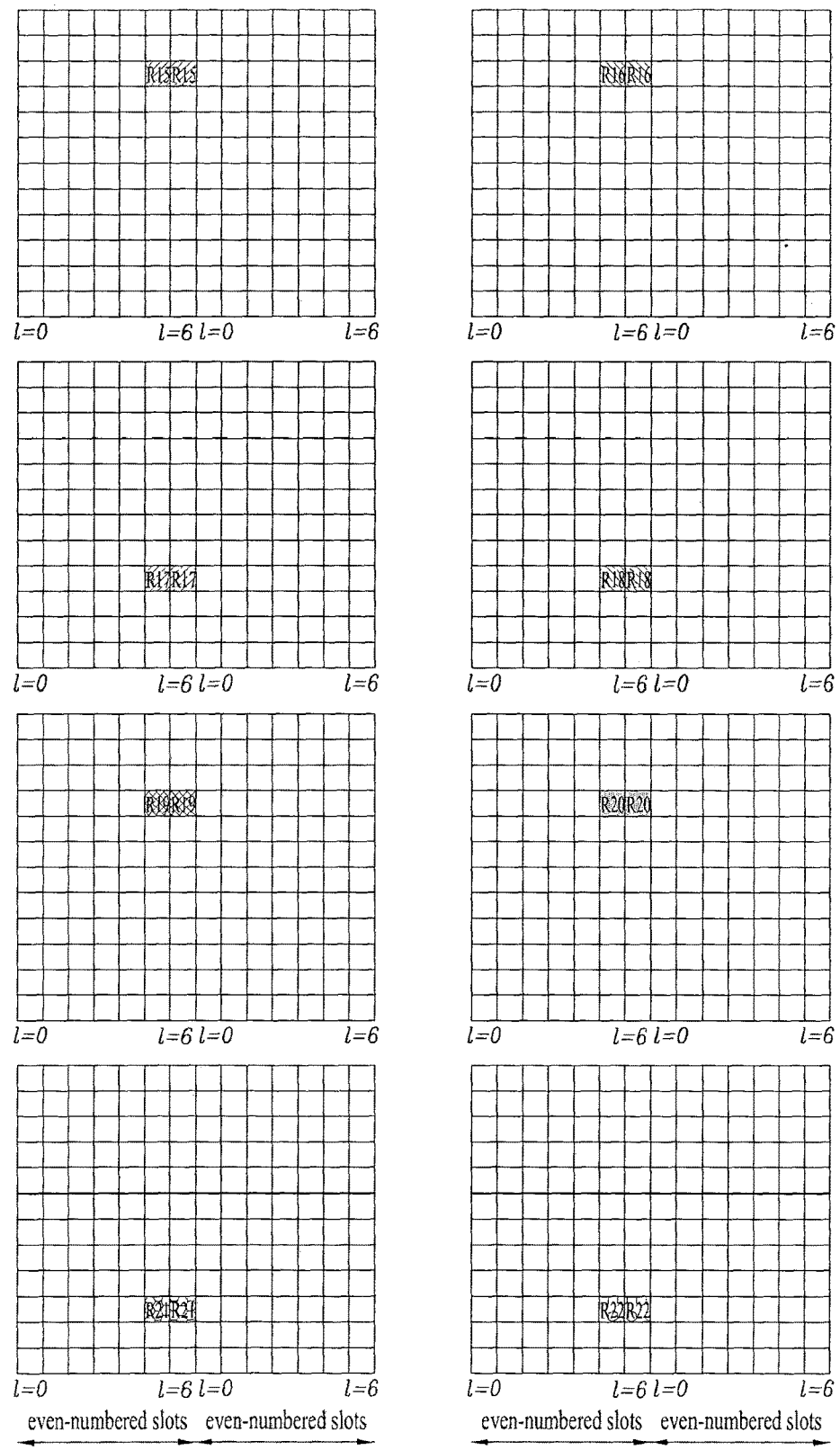
FIG. 11 illustrates Channel State Information-Reference Signal (CSI-RS) configuration #0 of downlink CSI-RS configurations defined in a current 3GPP standard specification.

In [Table 1] and [Table 2], (k',l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI\text{-}RS}$ and a subframe offset $\Delta_{CSI\text{-}RS}$. [Table 3] lists CSI-RS subframe configurations defined in the 3GPP standard.

TABLE 3

| CSI-RS-SubframeConfig $I_{CSI\text{-}RS}$ | CSI-RS periodicity $T_{CSI\text{-}RS}$ (subframes) | CSI-RS subframe offset $\Delta_{CSI\text{-}RS}$ (subframes) |
|---|---|---|
| 0-4 | 5 | $I_{CSI\text{-}RS}$ |
| 5-14 | 10 | $I_{CSI\text{-}RS}$ − 5 |
| 15-34 | 20 | $I_{CSI\text{-}RS}$ − 15 |
| 35-74 | 40 | $I_{CSI\text{-}RS}$ − 35 |
| 75-154 | 80 | $I_{CSI\text{-}RS}$ − 75 |

Information about a Zero Power (ZP) CSI-RS is transmitted in a CSI-RS-Config-r10 message configured as illustrated in [Table 4] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI\text{-}RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. That is, the current 3GPP standard defines a ZP CSI-RS only for four CSI-RS antenna ports.

TABLE 4

```
-- ASN1START
CSI-RS-Config-r10 ::=        SEQUENCE {
    csi-RS-r10               CHOICE {
    ...
    }
    zeroTxPowerCSI-RS-r10    CHOICE {
        release              NULL,
        setup                SEQUENCE {
            zeroTxPowerResourceConfigList-r10    BIT STRING
                                                 (SIZE (16)),
            zeroTxPowerSubframeConfig-r10        INTEGER
                                                 (0..154)
        }
    }
}
-- ASN1STOP
```

The current 3GPP standard defines modulation orders and cording rates for respective CQI indexes as illustrated in [Table 5].

TABLE 5

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINK) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Hereinbelow, transmission modes for a DL data channel will be described.

A current 3GPP LTE standard specification, 3GPP TS 36.213 defines DL data channel transmission modes as illustrated in [Table 6] and [Table 7]. A DL data channel transmission mode is indicated to a UE by higher-layer signaling, that is, RRC signaling.

TABLE 6

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

TABLE 7

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Transmit diversity |
| Mode 4 | DCI format 1A | Transmit diversity |
| | DCI format 2 | Transmit diversity |

TABLE 7-continued

| Transmission mode | DCI format | Transmission scheme of PDSCH corresponding to PDCCH |
|---|---|---|
| Mode 5 | DCI format 1A | Transmit diversity |
| Mode 6 | DCI format 1A | Transmit diversity |
| Mode 7 | DCI format 1A | Single-antenna port, port 5 |
| | DCI format 1 | Single-antenna port, port 5 |
| Mode 8 | DCI format 1A | Single-antenna port, port 7 |
| | DCI format 2B | Single-antenna port, port 7 or 8 |
| Mode 9 | DCI format 1A | Single-antenna port, port 7 |
| | DCI format 2C | Single-antenna port, port 7 or 8, |
| Mode 10 | DCI format 1A | Single-antenna port, port 7 |
| | DCI format 2D | Single-antenna port, port 7 or 8, |

Referring to [Table 6] and [Table 7], the 3GPP LTE standard specification defines DCI formats according to the types of RNTIs by which a PDCCH is masked. Particularly for C-RNTI and SPS C-RNTI, the 3GPP LTE standard specification defines transmission modes and DCI formats corresponding to the transmission modes, that is, transmission mode-based DCI formats as illustrated in [Table 6] and [Table 7]. DCI format 1A is additionally defined for application irrespective of transmission modes, that is, for a fall-back mode. [Table 6] illustrates transmission modes for a case where a PDCCH is masked by a C-RNTI and [Table 7] illustrates transmission modes for a case where a PDCCH is masked by an SPS C-RNTI.

Referring to [Table 6], if a UE detects DCI format 1B by blind-decoding a PDCCH masked by a C-RNTI, the UE decodes a PDSCH, assuming that the PDSCH has been transmitted in a single layer by closed-loop spatial multiplexing.

In [Table 6] and [Table 7], Mode 10 is a DL data channel transmission mode for CoMP. For example, in [Table 6], if the UE detects DCI format 2D by blind-decoding a PDCCH masked by a C-RNTI, the UE decodes a PDSCH, assuming that the PDSCH has been transmitted through antenna port 7 to antenna port 14, that is, based on DM-RSs by a multi-layer transmission scheme, or assuming that the PDSCH has been transmitted through a single antenna port, DM-RS antenna port 7 or 8.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may perform the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
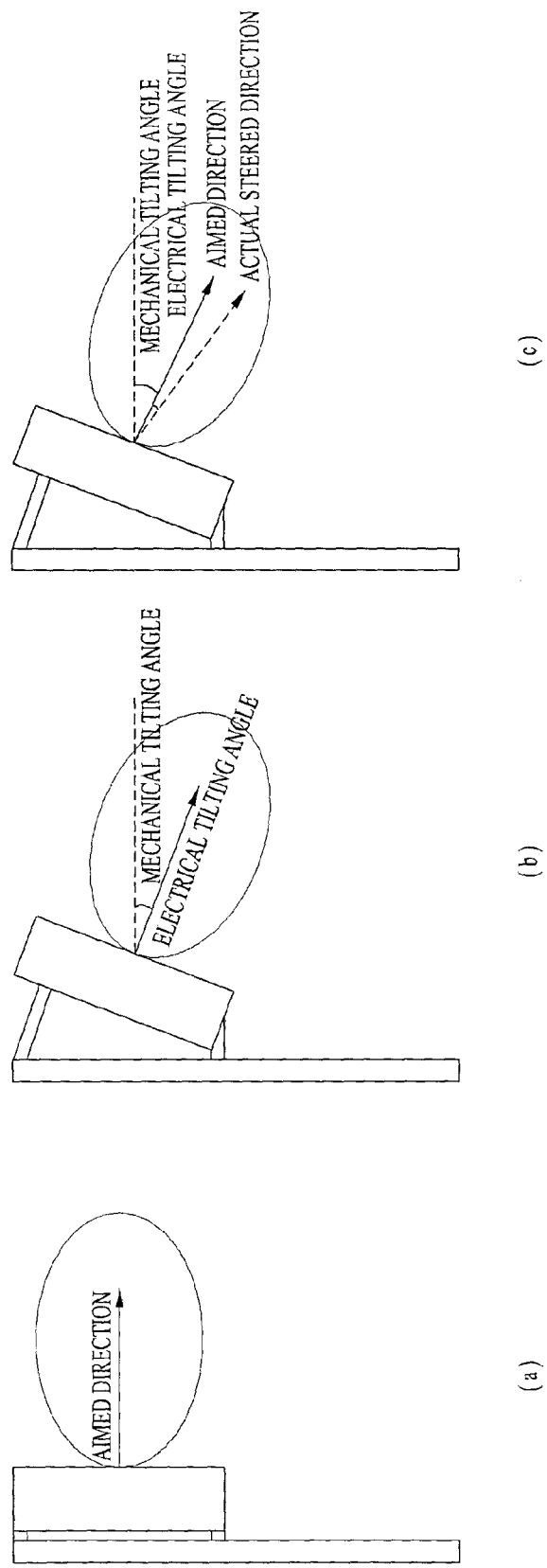
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical tilting are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
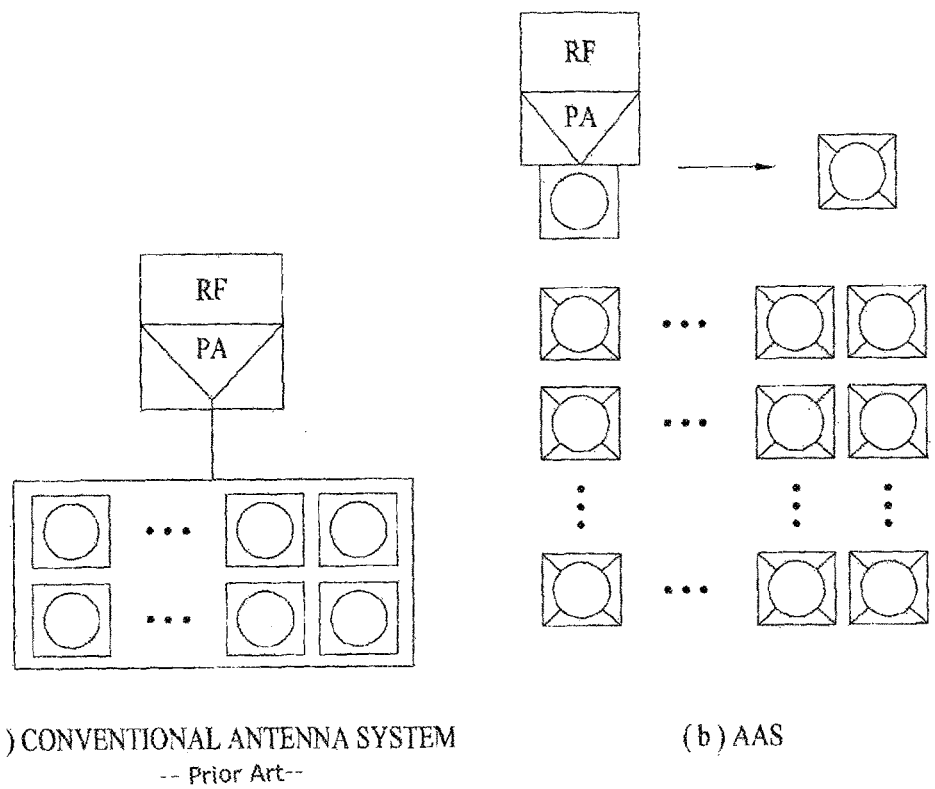
FIG. 13 is a view comparing an antenna system of the related art with an Active Antenna System (AAS)

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming. 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
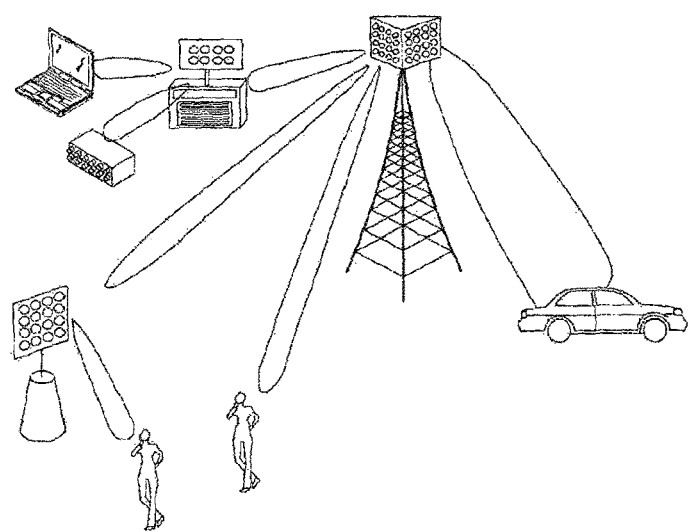
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
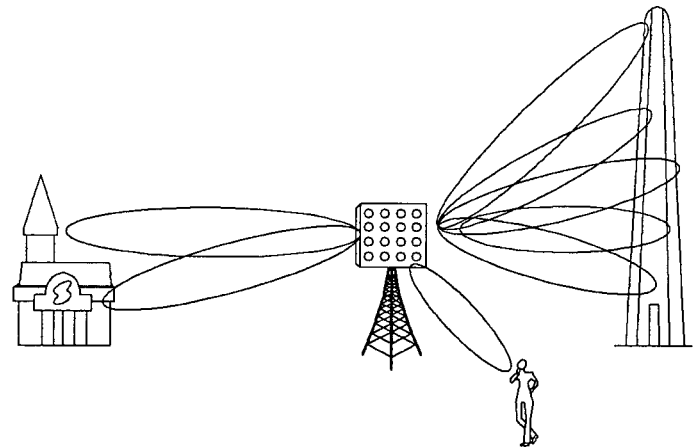
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

Now a description will be given of a MIMO system using linear precoding. A DL MIMO system may be modeled as [Equation 11] in frequency units (e.g. a subcarriers) that are assumed to experience flat fading in the frequency domain in a narrow band system or a wideband system.

$$y = Hx + z \quad \text{[Equation 11]}$$

If the number of Rx antenna ports at a UE is $N_r$, and the number of Tx antenna ports at an eNB is $N_t$, y is an $N_r \times 1$ signal vector received at the $N_r$ Rx antennas of the UE, H is a MIMO channel matrix of size $N_r \times N_t$, x is $N_t \times 1$ transmission signals, and z is an $N_r \times 1$ received noise and interference vector in [Equation 11].

The above system model is applicable to a multi-user MIMO scenario as well as a single-user MIMO scenario. While $N_r$ is the number of Rx antennas at the single UE in the single-user MIMO scenario, $N_r$ may be interpreted as the total number of Rx antennas at multiple UEs in the multi-user MIMO scenario.

The above system model is applicable to a UL transmission scenario as well as a DL transmission scenario. Then, $N_t$ may represent the number of Tx antennas at the UE and $N_r$ may represent the number of Rx antennas at the eNB.

In the case of a linear MIMO precoder, the MIMO precoder may be generally represented as a matrix U of size $N_t \times N_s$ where $N_s$ is a transmission rank or the number of transmission layers. Accordingly, the transmission signal vector x may be modeled as [Equation 12].

$$x = \sqrt{\frac{P_T}{N_s}} Us \quad \text{[Equation 12]}$$

where $P_T$ is transmission signal energy and s is an $N_s \times 1$ transmission signal vector representing signals transmitted in $N_s$ transmission layers. That is, $E\{s^H U^H Us\} = N_s$. Let $N_t \times 1$ precoding vectors corresponding to the $N_s$ transmission layers be denoted by $u_1, \ldots, u_{N_s}$. In this case, [Equation 12] may be expressed as [Equation 13].

$$x = \sqrt{\frac{P_T}{N_s}} \sum_{i=1}^{N_s} u_i s_i \quad \text{[Equation 13]}$$

where $s_i$ is an $i^{th}$ element of the vector s. Generally, it may be assumed that signals transmitted in different layers are uncorrelated ($E\{s_j^* s_i\} = 0 \forall i \neq j$) and the average magnitude of each signal is the same. If it is assumed that the average energy of each signal is 1 ($E\{|s_i|^2\} = 1 \forall i$) for the convenience of description, the sum of the energy of the layer precoding vectors is $N_s$ given as [Equation 14].

$$\sum_{i=1}^{N_s} E\{u_i^H u_i\} = N_s \quad \text{[Equation 14]}$$

If a signal is to be transmitted with the same power in each layer, it is noted from [Equation 14] that $E\{u_i^H u_i\} = 1$ As a future multi-antenna system such as massive MIMO or large-scale MIMO evolves, the number of antennas will increase gradually. In fact, use of up to 64 Tx antennas is considered for an eNB in the LTE standard, taking into account a 3D MIMO environment. The massive antenna array may have one or more of the following characteristics. 1) The array of antennas is allocated on a 2 dimensional plane or on a 3 dimensional space. 2) The number of logical or physical antennas is greater than 8. (An antenna port may refers to a logical antenna). 3) More than one antenna includes active components, i.e. active antenna(s). But, the definition of the massive antenna array does not limited the above-mentioned 1)~3).

However, as the number of antennas increases, pilot overhead and feedback overhead also increase. As a result, decoding complexity may be increased. Since the size of the MIMO channel matrix H increases with the number of antennas at an eNB, the eNB should transmit more measurement pilots to a UE so that the UE may estimate the MIMO channels. If the UE feeds back explicit or implicit information about the measured MIMO channels to the eNB, the amount of feedback information will increase as the channel matrix gets larger. Particularly when a codebook-based PMI feedback is transmitted as in the LTE system, the increase of antennas in number leads to an exponential increase in the size of a PMI codebook. Consequently, the computation complexity of the eNB and the UE is increased.

In this environment, system complexity and overhead may be mitigated by partitioning total Tx antennas and thus transmitting a pilot signal or a feedback on a sub-array basis. Especially from the perspective of the LTE standard, a large-scale MIMO system may be supported by reusing most of the conventional pilot signal, MIMO precoding scheme, and/or feedback scheme that support up to 8 Tx antennas.

From this viewpoint, if each layer precoding vector of the above MIMO system model is partitioned into M sub-precoding vectors and the sub-precoding vectors of a precoding vector for an $i^{th}$ layer are denoted by $u_{i,1}, \ldots, u_{i,M}$, the precoding vector for the $i^{th}$ layer may be represented as $u_i = [u_{i,1}^T \ u_{i,2}^T \ \ldots \ u_{i,M}^T]^T$.

Each sub-precoding vector experiences, as effective channels, a sub-channel matrix including Tx antennas in a partition corresponding to the sub-precoding vector, obtained by dividing the $N_r \times N_t$ MIMO channel matrix H by rows. The MIMO channel matrix H is expressed using the sub-channel matrices, as follows.

$$H = [H_1 \ldots H_M] \quad \text{[Equation 15]}$$

If the UE determines each preferred sub-precoding vector based on a PMI codebook, an operation for normalizing each sub-precoding vector is needed. Normalization refers to an overall operation for processing the value, size, and/or phase of a precoding vector or a specific element of the precoding vector in such a manner that sub-precoding vectors of the same size may be selected from a PMI codebook for the same number of Tx antennas.

For example, if the first element of the PMI codebook is 0 or 1, the phase and size of each sub-precoding vector may be normalized with respect to 0 or 1. Hereinbelow, it is assumed that a sub-precoding vector $u_{i,m}$ for an $m^{th}$ partition is normalized with respect to a value of $\alpha_{i,m}$ and the normalized sub-precoding vector or the Normalized Partitioned Precoder (NPP) is $v_{i,m}=u_{i,m}/\alpha_{i,m}$. Therefore, partitioned precoding is modeled as [Equation 16], in consideration of codebook-based precoding.

$$u_i = [\alpha_{i,1} v_{i,1}^T \; \alpha_{i,2} v_{i,2}^T \ldots \alpha_{i,M} v_{i,M}^T]^T \quad \text{[Equation 16]}$$

As noted from [Equation 16], the values of $\alpha_{i,m}$ may be interpreted as values that link the NPPs to each other from the perspective of the whole precoder. Hereinafter, these values will be referred to as linking coefficients. Thus, a precoding method for the total Tx antennas (antenna ports) may be defined by defining NPPs for the partitions of antenna ports and linking coefficients that link the NPPs to one another.

M linking coefficients for the $i^{th}$ layer may be defined as a vector $a_i = [\alpha_{i,1} \; \alpha_{i,2} \ldots \alpha_{i,M}]^T$. Herein, $a_i$ will be referred to as a 'linking vector'.

While it may be said that the linking vector is composed of M values, the other (M−1) values $b_i$ normalized with respect to the first element of the linking vector may be regarded as the linking vector. That is, the relative differences of the other (M−1) NPPs with respect to the first NPP may be defined as a linking vector as expressed in [Equation 17]. This is because it is assumed in many cases that the first element is already normalized from the perspective of the whole precoding vector $u_i$.

$$\frac{a_i}{\alpha_{i,1}} = \left[1 \; \frac{\alpha_{i,2}}{\alpha_{i,1}} \; \frac{\alpha_{i,3}}{\alpha_{i,1}} \ldots \frac{\alpha_{i,M}}{\alpha_{i,1}}\right]^T = [1 \; b_i^T]^T \quad \text{[Equation 17]}$$

If each of the transmission layers is divided into the same number of partitions, a linking matrix expressed as [Equation 18] may also be defined. An NPP for each partition in the form of a matrix may be defined as [Equation 19].

$$A = [a_1 \ldots a_{N_s}] \quad \text{[Equation 18]}$$

$$V_m = [v_{1,m} \ldots v_{N_s,m}], \; m=1,\ldots,M \quad \text{[Equation 19]}$$

Let a vector obtained by repeating each element of an M×1 linking vector as many times as the size of each partition be denoted by an extended linking vector $\hat{a}_i$. For example, if M=2 and the sizes of the first and second partitions are 3 and 4, respectively for an $i^{th}$ layer, $\hat{a}_i = [\alpha_{i,1} \; \alpha_{i,1} \; \alpha_{i,1} \; \alpha_{i,2} \; \alpha_{i,2} \; \alpha_{i,2} \; \alpha_{i,2}]^T$. An extended linking matrix $\hat{A} = [\hat{a}_1 \ldots \hat{a}_{N_s}]$ may be defined by stacking the extended linking vectors.

In this case, the whole precoding matrix may be expressed as a Hadamard product (or element-wise product) between the extended linking matrix and the NPP matrix $V_t$ in [Equation 20].

$$U = \hat{A} \circ V_t \quad \text{[Equation 20]}$$

where $V_t = [V_1^T \ldots V_M^T]^T$ and the matrix operator $\circ$ represents the Hadamard product.

The (extended) linking vectors and the (extended) linking matrix are collectively called a linking precoder. The term precoder is used herein because the (extended) linking vectors and the (extended) linking matrix are elements determining the Tx antenna precoder. As noted from [Equation 20], one linking precoder may be configured, which should not be construed as limiting the present invention. For example, a plurality of sub-linking vectors may be configured by additional partitioning of the linking vector $a_i$ and sub-linking precoders may be defined accordingly. While the following description is given in the context of a single linking precoder, a linking precoder partitioning scenario is not excluded.

While the linking coefficients are represented in such a manner that different linking coefficients are applicable to different transmission layers in the same partition, if each layer is partitioned in the same manner, the linking coefficients may be configured independently of the transmission layers. That is, the same linking coefficients may be configured for every layer. In this case, the relationship that $a_1 = \ldots = a_{N_s}$ is established between the linking vectors. Then the linking precoder may be expressed only with M or (M−1) linking coefficients.

MIMO precoding schemes may be categorized largely into closed-loop precoding and open-loop precoding. When a MIMO precoder is configured, channels between a transmitter and a receiver are considered in the closed-loop precoding scheme. Therefore, additional overhead such as transmission of a feedback signal from a UE or transmission of a pilot signal is required so that the transmitter may estimate MIMO channels. If the channels are accurately estimated, the closed-loop precoding scheme outperforms the open-loop precoding scheme. Thus, the closed-loop precoding scheme is used mainly in a static environment experiencing little channel change between a transmitter and a receiver (e.g. an environment with a low Doppler spread and a low delay spread) because the closed-loop precoding scheme requires channel estimation accuracy. On the other hand, the open-loop precoding scheme outperforms the closed-loop precoding scheme in an environment experiencing a great channel change between a transmitter and a receiver because there is no correlation between the channel change between the transmitter and the receiver and a MIMO precoding scheme.

To apply closed-loop precoding to a massive MIMO environment having a large number of antennas, information about each sub-precoder and information about a linking precoder are required. Without codebook-based feedback, the linking precoder information may not be needed. Depending on a partitioning method, effective channels experienced by each sub-precoder may have different characteristics from effective channels experienced by the linking precoder.

For example, one sub-precoder may experience MIMO channels having a relatively low Doppler spread, whereas another sub-precoder may experience MIMO channels having a relatively high Doppler spread. In another example, while all sub-precoders may experience effective channels having similar Doppler characteristics, the linking precoder may experience effective channels having different Doppler characteristics. Accordingly, the present invention provides a factional beamforming scheme that optimizes MIMO transmission adaptively according to the characteristics of each partitioned channel and a linking channel in the partitioned precoding environment.

Embodiment 1: Fractional Beamforming

An eNB may apply closed-loop precoding only to a part of precoders for partitions of antenna ports and a linking precoder that links the antenna port partitions to one another and may apply one of the following precoding schemes to the remaining part of the remaining part of the precoders and the linking precoder.

1. System-set precoding (hereinafter, referred to as default precoding);
2. Precoding preset by an eNB or a network (hereinafter, referred to as reference precoding); and
3. Precoding randomly selected by an eNB (hereinafter, referred to as random precoding).

A set of partitions and/or linking coefficients to which closed-loop precoding is applied is referred to as a controlled space and a set of partitions and/or linking coefficients to which closed-loop precoding is not applied is referred to as an uncontrolled space.

In default precoding, the system defines a beam for transmission in the uncontrolled space. It may be regulated that default precoding follows open-loop precoding. A different default precoding scheme may be set according to a system bandwidth, the number of Tx antennas at an eNB, the number of transmission layers (or a transmission rank), a Tx antenna configuration of the eNB ($N_{t\_v}$, $N_{t\_h}$), or the number of Tx antennas directed in an uncontrolled direction. Or a specific beam may be set irrespective of the system parameters in the default precoding scheme. In addition, the default precoding scheme may be fixed across a total frequency band and a total time area or may be changed on a predetermined time resource unit basis and/or a predetermined frequency resource unit basis.

In reference precoding, the eNB or the network configures a precoding scheme to be applied to the uncontrolled space for a UE. Accordingly, reference precoding information for the uncontrolled space is transmitted to the UE by a physical layer message or a higher layer message. The reference precoding information is any information that indicates a MIMO precoder to be applied to the uncontrolled space implicitly or explicitly. For example, the reference precoding information may include a specific index (PMI) of a PMI codebook corresponding to the number of uncontrolled space Tx antennas, the quantized value of each element of a MIMO precoding matrix for the uncontrolled space, and an index for use in transmission, selected from among the indexes of a plurality of MIMO precoding schemes.

Reference precoding may also be changed on a predetermined time resource unit basis and/or a predetermined frequency resource unit basis. In this case, a plurality of reference precoding patterns that change in time/frequency resources are defined and then the index of a reference precoding pattern used by the eNB or the network may be signaled as reference precoding information. Or a seed value of a random variable generator that may induce reference precoding patterns that change in time/frequency resources may be used as reference precoding information. Or reference precoding information may be configured to indicate a used precoding scheme selected from among various precoding schemes (e.g. Space Time Block Coding (STBC), delay diversity, etc.).

In random precoding, the eNB randomly selects a precoding scheme for the uncontrolled space. Therefore, compared to default precoding or reference precoding, the UE does not have knowledge of a precoder to be applied to the uncontrolled space. For example, the eNB may transmit a beam that changes randomly in the uncontrolled space on a predetermined time resource basis (e.g. on an OFDM symbol basis) and/or a predetermined frequency resource unit basis (e.g. on a subcarrier basis).

According to the fractional beamforming method in the embodiment of the present invention, independent partitioning and fractional beamforming may be applied to each transmission layer. Or the same partitioning and beamforming scheme may be applied to all transmission layers.

The fractional beamforming method of the present invention is very useful, when the reliability of feedback information about a part of Tx antennas or the reliability of feedback information about linking coefficients is low or in a channel environment that does not require such a feedback. Especially when the reliability of feedback information about a part of Tx antennas or the reliability of feedback information about linking coefficients is low, the fractional beamforming method is advantageous in that a packet reception error and unnecessary packet retransmission caused by a feedback information error can be prevented. In addition, when the feedback is unnecessary, the fractional beamforming method can minimize feedback overhead.

Embodiment 2: Aligned Fractional Precoding

If a part or all of antenna port partitions are of the same size and corresponding partitioned antenna arrays have similar effective channel characteristics, the same precoding scheme, that is, aligned fractional precoding may be applied to corresponding NPPs.

Figure 16:
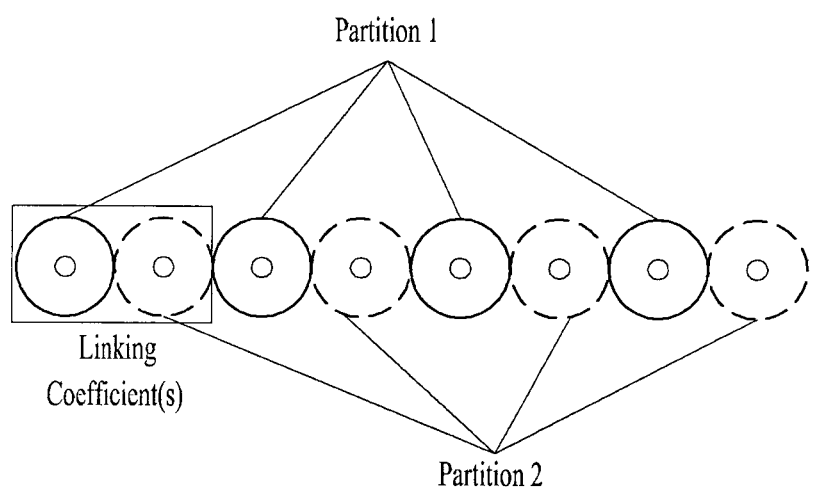
FIG. 16 illustrates an example of applying aligned fractional precoding to a uniform linear array according to another embodiment of the present invention.

FIG. 16 illustrates an example of applying aligned fractional precoding to a Uniform Linear Array (ULA) according to another embodiment of the present invention.

Referring to FIG. 16, in a ULA with 8 antennas, a first partition (Partition 1) includes $1^{st}$, $3^{rd}$, $5^{th}$, and $7^{th}$ antennas and a second partition (Partition 2) includes 2nd, $4^{th}$, $6^{th}$, and $8^{th}$ antennas. If the gap between antennas is narrow and there are not many scatterers around the ULA, Partition 1 and Partition 2 are highly likely to experience similar MIMO channels except for a phase difference between the two partitions, corresponding to a linking precoder component. In this case, the same precoding scheme is configured for the two partitions.

Figure 17:
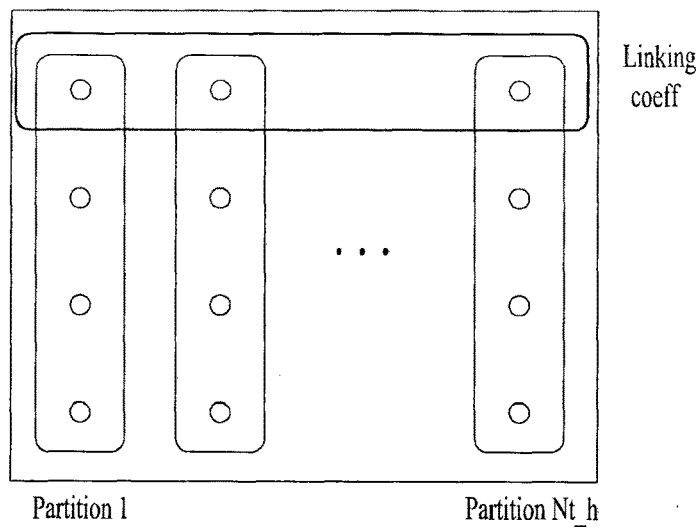
FIG. 17 illustrates an example of applying columnwise aligned fractional precoding to a square array according to another embodiment of the present invention.

FIG. 17 illustrates an example of applying columnwise aligned fractional precoding to a square array according to another embodiment of the present invention.

Referring to FIG. 17, each column is set as one partition in a square array having $N_t(=N_{t\_v} \times N_{t\_h})$ antennas arranged in $N_{t\_v}$ rows and $N_{t\_h}$ columns. If the gap between columns is narrow and $N_{t\_h}$ is not large, the same precoding scheme may be configured for all partitions. However, a linking vector is set independently of the sub-precoder.

Figure 18:
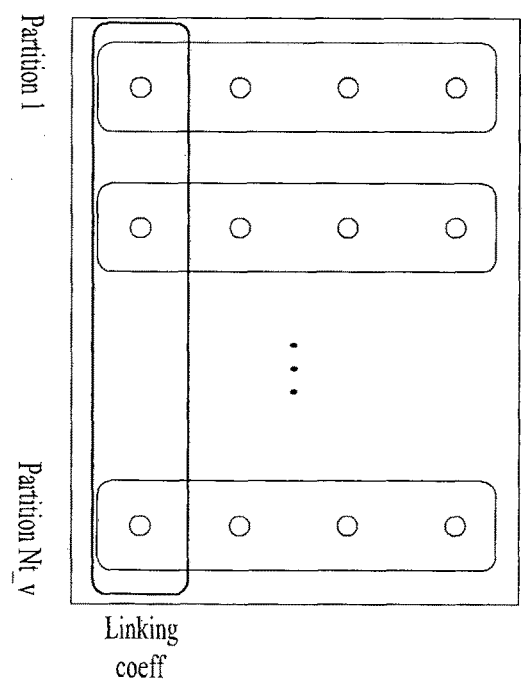
FIG. 18 illustrates an example of applying rowwise aligned fractional precoding to a square array according to another embodiment of the present invention.

FIG. 18 illustrates an example of applying rowwise aligned fractional precoding to a square array according to another embodiment of the present invention.

Referring to FIG. 18, each row is set as one partition in a square array having $N_t(=N_{t\_v} \times N_{t\_h})$ antennas arranged in $N_{t\_v}$ rows and $N_{t\_h}$ columns. If the gap between rows is narrow and $N_{t\_v}$ is not large, the same precoding scheme may be configured for all partitions. However, a linking vector is set independently of the sub-precoder.

Figure 19:
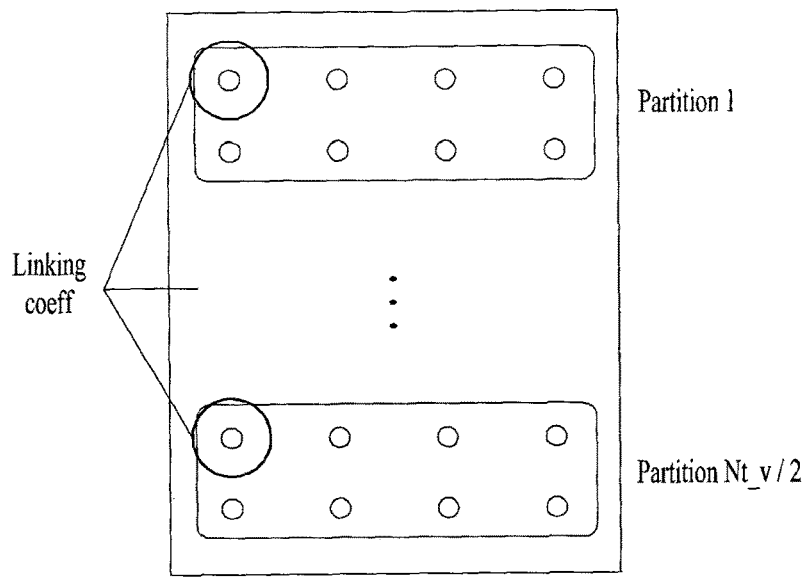
FIG. 19 illustrates an example of applying row groupwise aligned fractional precoding to a square array according to another embodiment of the present invention.

FIG. 19 illustrates an example of applying row groupwise aligned fractional precoding to a square array according to another embodiment of the present invention.

Referring to FIG. 19, each row group including N rows is set as one partition in a square array having $N_t(=N_{t\_v} \times N_{t\_h})$ antennas arranged in $N_{t\_v}$ rows and $N_{t\_h}$ columns. If the gap between row groups is narrow and $N_{t\_v}$ is not large, the same precoding scheme may be set for all partitions. However, a linking vector is set independently of the sub-precoder.

As illustrated in FIGS. 16 to 19, if all partitions are of the same size and the same precoder is applied to the partitions (i.e. $v_i \Box v_{i,1} = \ldots = v_{i,M}$), a precoder for an $i^{th}$ layer may be represented as a Kronecker product between a linking precoder and a sub-precoder, given as [Equation 21].

$$u_i=[\alpha_{i,1}v_{i,1}{}^T \quad \alpha_{i,2}v_{i,2}{}^T \quad \ldots \quad \alpha_{i,M}v_{i,M}{}^T]^T=[\alpha_{i,1}v_i{}^T$$
$$\alpha_{i,2}v_i{}^T \ldots \alpha_{i,M}v_i{}^T]^T=a_{i,}\otimes v_i \quad \text{[Equation 21]}$$

If all transmission layers are partitioned in the same manner, a MIMO precoder for the total layers may be represented as a Khatri-Rao product (a columnwise Kronecker product) between an $M \times N_s$ linking matrix A and an $$\frac{N_t}{M} \times N_s$$

sub-precoding matrix $V=[v_1 \ldots v_{N_s}]$, given as [Equation 22].

$$U=[a_1 \otimes v_1 \ldots a_{Ns} \otimes v_{Ns}]=A*V \quad \text{[Equation 22]}$$

If each column is set as one partition in a Two-Dimensional (2D) antenna port array environment as illustrated in FIG. 17, vertical beamforming (or elevation beamforming) is performed using the sub-precoder $v_i$ or V and horizontal beamforming (or azimuth beamforming) is performed using the linking precoder $a_i$ or A. If each row is set as one partition in a 2D antenna port array environment as illustrated in FIG. 18, horizontal beamforming (or azimuth beamforming) is performed using the sub-precoder $v_i$ or V and vertical beamforming (or elevation beamforming) v is performed using the linking precoder $a_i$ or A.

In the case of perfectly aligned fractional precoding in a row or column direction in a 2D antenna (port) array environment as illustrated in FIG. 17 or FIG. 18, a precoder that performs 3D beamforming may be expressed as one sub-precoder and one linking precoder. Vertical beamforming is performed using one of the sub-precoder and the linking precoder and horizontal beamforming is performed using the other precoder.

If the fractional beamforming proposed for the environment of perfectly aligned fractional precoding is used, the eNB applies closed-loop precoding to one of a sub-precoder and a linking precoder and one of default precoding, reference precoding, and random precoding to the other precoder in an environment where the same precoding is used for all partitions.

The second embodiment of the present invention is useful to 3D beamforming in a 2D antenna array environment as illustrated in FIGS. 17 and 18. 3D beamforming, particularly UE-specific 3D beamforming advantageously optimizes transmission performance according to the horizontal and vertical positions of a UE and a scattering environment of a 3D space. However, UE-specific 3D beamforming is a closed-loop precoding scheme and thus requires accurate CSI between an eNB and a UE.

Therefore, as the number of eNB antennas and the dimension of beamforming increase, the difference between a minimum performance value and a maximum performance value gets wider depending on MIMO transmission schemes. Consequently, performance gets more sensitive to a CSI estimation error factor of an eNB, such as a channel estimation error, a feedback error, and channel aging. If the CSI estimation error of the eNB is not significant, normal transmission may be performed due to channel coding or the like. On the other hand, in the case of a serious CSI estimation error in the eNB, a packet reception error occurs and packet retransmission is required, thus degrading performance considerably.

For example, 3D beamforming for a UE that is moving fast in a horizontal direction with respect to an eNB increases a packet retransmission probability. While open-loop precoding is conventionally used for the UE, vertical beamforming is favorable for the UE because the UE experiences a static channel in a vertical direction. On the other hand, horizontal beamforming is favorable for a UE fast moving in the vertical direction or an environment where scattering is severe in the vertical direction. For a UE located in a narrow, tall building, the eNB may perform 3D beamforming with horizontal beamforming fixed to a specific direction. That is, the UE is instructed to configure feedback information only for vertical beamforming, thus reducing feedback overhead.

Therefore, if the fractional beamforming according to the second embodiment of the present invention is applied to a 3D beamforming environment, 2D beamforming (vertical beamforming or horizontal beamforming) may be performed according to a user environment. In this respect, the fractional beamforming scheme may be called partial dimensional beamforming. For example, an eNB having 2D Tx antenna ports may apply closed-loop precoding to one of a vertical precoder and a horizontal precoder and one of default precoding, reference precoding, and random precoding to the other precoder.

Embodiment 3

In the fractional precoding schemes according to the forgoing embodiments of the present invention, each sub-precoder and a linking precoder have been defined from the viewpoint of data transmission from an eNB. In regards to a sub-precoder and a linking precoder to which closed precoding is applied, a UE may transmit a Preferred Precoding Index (PPI) to an eNB. After matrix precoders are indexed, a preferred matrix precoder index may be fed back as a PPI in a PMI feedback scheme.

If some feedback information is separated on the basis of a unit including a partition and/or a value linking partitions, pilot signals transmitted from an eNB to a UE may be associated with a set of specific antenna ports. A set of such pilot signals is called a pilot pattern. A major pilot pattern involves Non-Zero-Power (NZP) CSI-RS resources (or processes) which are measurement pilots used in the LTE system. For example, the following mapping relationship may be established between partitions, CSI-RSs, and PMI feedbacks.

A. Aligned Unit of Partition & Pilot Pattern & PMI Feedback 1. (Partition): in a system with 16 antenna ports, an eNB divides the 16 antenna ports into two partitions each having 8 antenna ports and performs fractional precoding on the two partitions.

2. (Pilot pattern): the eNB allocates 8Tx NZP CSI-RS resources to each partition for a UE, that is, configures two co-located NZP CSI-RS resources for the UE in order to support the fractional precoding.

3. (PMI feedback): the UE feeds back PMI1 and PMI2 for the two antenna port partitions, and linking coefficients (e.g. PMI3 for a linking precoder) that link PMI1 to PMI2.

That is, if an NZP CSI-RS resource is separately allocated to each antenna port partition, the eNB may configure a plurality of NZP CSI-RS resources to the UE, for a plurality of co-located (or synchronized) antenna port partitions belonging to the eNB (or transmission point). To distinguish a non-co-located antenna port pattern used for CoMP transmission from the co-located antenna port patterns, the eNB may additionally indicate co-location or non-co-location between NZP CSI-RS resources. For example, a Quasi-Co-Location (QCL) condition between a plurality of NZP CSI-RS resources may be indicated to the UE.

A pilot transmission unit and an antenna port partition unit are not always identical as in the above example. For example, when one 8Tx CSI-RS resource is configured, the UE may configure feedback information for two 4Tx partitions. In addition, an antenna port partition unit and a feedback unit are not always identical. Particularly in the case of aligned partitioned precoding, common PPI feedback information may be transmitted for partitions to which the same precoding is applied. Therefore, one feedback unit may be configured for a plurality of partitions.

B. Not Aligned Unit of Partition & Pilot Pattern & PMI Feedback 1. (Partition): it is assumed that antenna ports are partitioned as illustrated in FIG. 18.

2. (PMI feedback): feedback information includes a PPI commonly applied to all partitions (referred to as a common PPI) and linking coefficients, in consideration of perfectly aligned fractional precoding. In this case, the partition unit and the feedback unit may be different.

Figure 20:
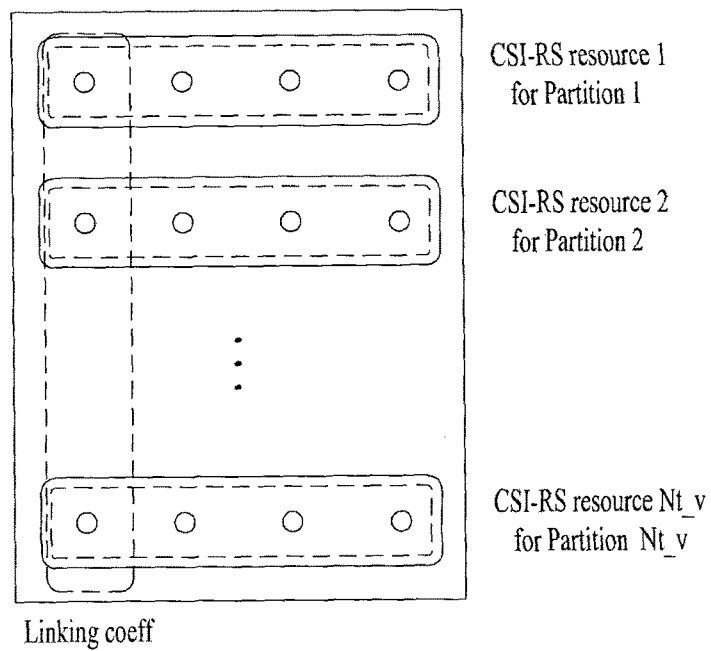
FIGS. 20, 21, and 22 illustrate methods for allocating a pilot pattern according to a third embodiment of the present invention.
Figure 21:
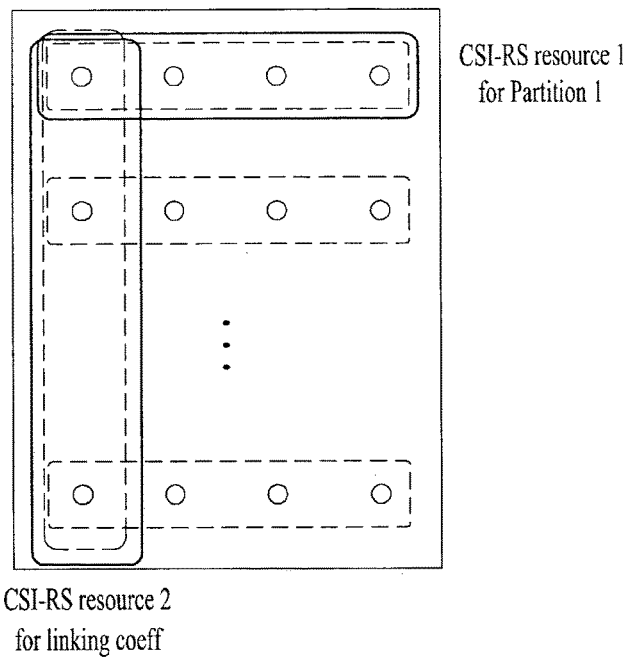
Figure 22:
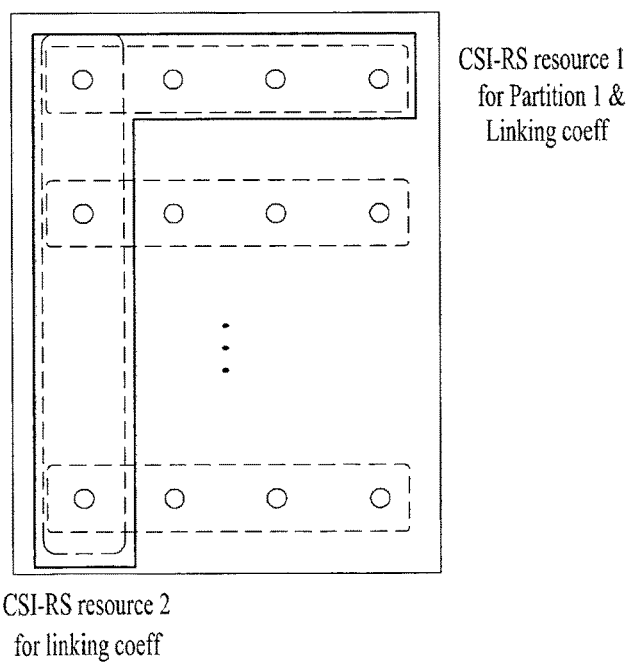

3. (Pilot pattern): a pilot pattern may be allocated in various manners. FIGS. 20, 21, and 22 illustrate exemplary pilot pattern allocation methods according to a third embodiment of the present invention. Specifically, a pilot resource may be configured separately for each partition as illustrated in FIG. 20. As illustrated in FIG. 21, one pilot pattern may be transmitted in a first partition so that the UE may calculate a common PPI, and one pilot pattern may be transmitted through antenna ports to which a linking precoder is applied, so that the UE may calculate linking coefficients. Or only one pilot pattern may be configured so that the UE may calculate a common PPI and linking coefficients at one time, as illustrated in FIG. 22.

Embodiment 4: CSI Calculation for Fractional Beamforming

A fourth embodiment of the present invention provides a method for calculating CSI and a method for configuring CSI feedback information at a UE, for fractional beamforming. It is assumed as a CSI calculation method of a UE in a fractional beamforming system that the UE applies one of default precoding, reference precoding, and random precoding to a part of antenna port partitions and linking coefficients, corresponding to an uncontrolled space, when the UE measures or calculates partial CSI.

The partial CSI includes a CQI and an RI as well as a PMI. In the case of random precoding, the UE has no knowledge of a precoding scheme that the eNB applies to the uncontrolled space and thus the UE calculates CSI, assuming an arbitrary precoding scheme for the uncontrolled space as applied by the eNB.

After the UE assumes an arbitrary precoding scheme for the uncontrolled space, the UE may calculate CSI in the following manners.

(1) The UE sets N precoder candidates (N is a finite number) for the uncontrolled space and calculates CQIs that may be achieved using the respective candidates, $CQI_1, \ldots, CQI_N$. Then the UE reports the average of the CQIs calculated for all precoder candidates for the uncontrolled space (i.e. $CQI=(CQI_1+ \ldots +CQI_N)/N$) to the eNB.

(2) The UE sets N precoder candidates (N is a finite number) for the uncontrolled space and calculates CQIs that may be achieved using the respective candidates, $CQI_1, \ldots, CQI_N$. Then the UE reports the CQI of a worst case among all precoder candidates for the uncontrolled space (i.e. $CQI=\text{minimum of } \{CQI_1, \ldots, CQI_N\}$) to the eNB.

(3) The UE may generate and set a random precoder for the uncontrolled space and may calculate a CQI that may be achieved using the precoder. Then the UE may feed back the CQI to the eNB.

If the above CQI calculation methods are extended/applied to a partial dimensional beamforming technique for a 3D beamforming environment, the UE may apply one of default precoding, reference precoding, and random precoding to one of a vertical precoder and a horizontal precoder in measuring or calculating partial CSI.

While a partition viewpoint and a CSI feedback viewpoint have been associated in the above description, a pilot-CSI feedback relationship may be different from a partition-CSI feedback relationship. Therefore, the UE may apply one of default precoding, reference precoding, and random precoding to a part of a plurality of (co-located) antenna port patterns and values that link the (co-located) antenna port patterns, corresponding to the uncontrolled space, in measuring or calculating partial CSI. The antenna port patterns cover NZP CSI-RS resources and CSI-RS patterns. This will be specified as the followings.

(A) If a linking precoder (or a vertical precoder) belongs to the uncontrolled space in the example of FIG. 20, the eNB sets a plurality of (co-located) pilot patterns and the UE calculates CSI on the assumption that a value linking a PMI(s) to be applied to MIMO channels corresponding to each pilot pattern is a system-set value, a value set by an eNB, or a random value.

(B) If sub-precoders (or horizontal precoders) belong to the uncontrolled space in the example of FIG. 20, the eNB sets a plurality of (co-located) pilot patterns and the UE calculates CSI on the assumption that a precoder to be applied to a part or all of the pilot patterns is a system-set value, a value set by an eNB, or a random value.

(C) If a linking precoder (or a vertical precoder) belongs to the uncontrolled space in the example of FIG. 21, the eNB configures two co-located pilot patterns for the UE and the UE calculates CSI on the assumption that a precoder to be applied to MIMO channels corresponding to one of the pilot patterns is a system-set value, a value set by an eNB, or a random value.

(D) The eNB configures one pilot pattern for the UE in the example of FIG. 22, and the UE calculates CSI on the assumption that a precoder to be applied to MIMO channels corresponding to a part of antenna ports belonging to the pilot pattern is a system-set value, a value set by an eNB, or a random value.

Embodiment 5: CSI Contents for Fractional Beamforming

Implicit feedback information for fractional beamforming may include a UE-preferred PMI or coefficients for a part of partitions and/or a linking precoder. When configuring PPI feedback information, the UE may include, as CSI contents, only a PPI for a part of a plurality of (co-located) antenna port patterns and values linking the (co-located) antenna port patterns to one another, corresponding to an uncontrolled space, taking into account the relationship between a pilot (pattern) and a PMI feedback.

Since the (co-located) antenna port patterns belong to the same transmission point, it is efficient to feed back a common CQI and a common RI to an eNB. Therefore, when configuring feedback information, the UE may include, as CSI contents, a PPI for a part of a plurality of (co-located) antenna port patterns and values linking the (co-located) antenna port patterns to one another, corresponding to an uncontrolled space, and a CQI and RI for the total (co-located) antenna port patterns. Specifically, CSI contents may be configured in the following manners (a), (b), and (c).

(a) The eNB configures N (co-located) pilot patterns CSI-RS #0, . . . , N−1 for the UE and the UE transmits PMIs for M (M<N) pilot patterns from among the N pilot patterns and a CQI and RI for the total antennas. The UE may additionally feed back a PMI for a linking precoder. In this case, the UE may calculate PMIs, CQIs, and Ms for CSI-RS patterns for which PMIs are not reported to the eNB, by the CSI calculation method according to the fourth embodiment of the present invention.

(b) In the CSI-RS transmission method for a 3D beamforming environment, illustrated in FIG. 21, the eNB may configure two (co-located) CSI-RS patterns and the UE may transmit, to the eNB, a PMI for one of the two CSI-RS patterns and a CQI and RI for aggregated CSI-RS resources of the two CSI-RS patterns. In this case, since the first antenna ports of the two CSI-RS patterns correspond to the same physical antenna, the UE does not transmit a PPI for a linking precoder.

(c) In the single pilot pattern configuration method illustrated in FIG. 22, the eNB may configure one CSI-RS pattern for the UE and the UE may transmit, to the eNB, a PMI for a part of the antenna ports of the CSI-RS pattern and a CQI and RI for the whole antenna ports.

While it is assumed in (a), (b), and (c) that one CQI is fed back for the whole transmission layers, the present invention is not limited to the specific assumption. For example, if the same Modulation and Coding Scheme (MCS) is set for a plurality of layers as in the LTE system, a CQI may be fed back on a codeword basis. In this case, one CQI per codeword may be transmitted.

For fractional beamforming, information about channel movement of the UE is needed as CSI or an additional feedback. Specifically, this information may include statistic information about channels (e.g. a Line Of Sight (LOS) parameter, path loss, correlation, etc.) and mobility information (movement direction, speed, acceleration, Doppler spread, etc.).

Particularly, the movement direction may be an absolute direction (e.g. a change in a relative position with respect to a predetermined reference position) or a relative direction (e.g. a change in the position of the UE with respect to the position of a reference eNB). The reference eNB position may refer to the position of a serving eNB (transmission point), the position of a predetermined eNB (transmission point), or specific coordinates signaled by an eNB. Further, the relative direction may be measured based on a specific signal such as a Positioning Reference Signal(s) (PRS(s)) received from an eNB(s) or a specific message including relative distance information or response delay information.

In the foregoing embodiments of the present invention, one PMI is not always represented as a single index. For example, the LTE system regulates that a UE feeds back two PMIs for 8 Tx antenna ports of an eNB. Accordingly, if one pilot pattern includes 8 or more Tx antenna ports, two or more PMIs may be used to indicate preferred indexes for each pilot pattern.

If feedback information configured according to the present invention is applied to a wide band system, specific frequency areas may be defined (e.g. subbands, subcarriers, resource blocks, etc.) and a set of feedback information may be transmitted for each frequency area. Or feedback information may be transmitted only for a specific frequency area selected by a UE or indicated by an eNB. The frequency area may include one or more contiguous or non-contiguous frequency areas.

Embodiment 6: Network-Controlled Flexible Fractional Beamforming

To perform fractional beamforming or partitioned beamforming according to the present invention, an eNB may provide the following control information A) to D). Then the UE may configure feedback information based on the control information and report the feedback information to the eNB.

A) Antenna port partitioning information including information about the number of partitions and the size of each partition, or information about the form factor of each partition. The form factor generically refers to physical characteristics of antenna ports included in each partition, including polarization characteristics, transmission power, a radiation pattern, the number of physical antennas for one antenna port, and characteristic information about the physical antennas. Particularly, an antenna port partition may be defined as a basic feedback unit for the UE, under circumstances.

B) Mapping information between antenna port partitions and pilot patterns. The mapping information between antenna port partitions and pilot patterns indicates the relationship between antenna port partitions and pilot patterns explicitly or implicitly, as illustrated in FIGS. 20, 21, and 22.

C) A reference antenna port or a reference pilot pattern, for linking coefficients. The reference antenna port or the reference pilot pattern is a reference for measuring relative phases and magnitudes in measuring linking coefficients at the UE.

D) Co-location information about pilot patterns or antenna partitions. If a plurality of pilot patterns (or antenna partitions) are configured for the UE, the co-location information indicates whether the pilot patterns (or the antenna partitions) are transmitted from the same position, that is, from the same node.

The control information A) to D) may be transmitted to the UE by a physical layer message or a higher layer message and the characteristics of signaling (e.g. a signaling scheme, a signaling period, signaling resources, a channel, etc.) may be different for each piece of control information. The eNB/UE may correspond to a transmitter/receiver. That is, if the transmitter performs fractional beamforming, the transmitter may provide a part of the control information to the receiver.

For example, if each antenna port partition is mapped to one NZP CSI-RS resource in the LTE system, as illustrated in FIGS. 21 and 22, the eNB may provide information about antenna port partitions to the UE by allocating a plurality of NZP CSI-RS resources for a plurality of co-located antenna ports to the UE. Herein, the eNB may indicate to the UE whether different NZP CSI-RS resources are transmitted from the same node by indicating to the UE whether the NZP CSI-RS resources are co-located. That is, a QCL condition between the plurality of CSI-RS resources may be newly defined and indicated to the UE. In this case, the UE may assume that quasi-co-located CSI-RS resources are transmitted from the same node and non-quasi-co-located CSI-RS resources are transmitted from different nodes.

Fractional beamforming may optimize feedback overhead and decrease a transmission error probability according to the channel state between a transmitter and a receiver. In the case of fractional beamforming for DL transmission, the channel state between an eNB and each UE may be very different. For example, UE A may be placed in a low Doppler channel state, UE B may be placed in a high Doppler channel state, and UE C may be placed in a low Doppler channel state restrictively for some partition. Accordingly, whether to apply fractional beamforming should be determined differently for each UE and when fractional beamforming is applied, a different controlled space and a different uncontrolled space should be configured for each UE. Even for the same UE, it is necessary to determine whether to perform fractional beamforming and to change the configurations of a controlled space and an uncontrolled space for fractional beamforming, adaptively according to the movement of the UE or a change in an ambient environment.

Therefore, the eNB should provide the UE with information about activation or deactivation of fractional beamforming, information about a fractional beamforming mode, and information about a precoding scheme for an uncontrolled space.

1) Information about activation or deactivation of fractional beamforming implicitly or explicitly indicates whether fractional beamforming is applied. This information may be configured as a message indicating activation of fractional beamforming, or may specify a transmission mode supporting fractional beamforming or a transmission mode that does not support fractional beamforming.

2) Information about a fractional beamforming mode indicates a controlled space and an uncontrolled space for fractional beamforming, explicitly or implicitly.

For example, the fractional beamforming mode information may specify a CSI configuration for each antenna partition (or each pilot pattern). The CSI configuration indicates CSI required for the antenna partition (or the pilot pattern). For example, The CSI configuration may indicate whether a PMI is to be reported for the pilot pattern (specifically, CSI-RS pattern). That is, if a PMI feedback is required, this information indicates a closed-loop pilot pattern for the controlled space or an open-loop pilot pattern for the uncontrolled space.

In the current LTE system, PMI reporting or no PMI reporting is determined according to transmission modes (in the case of TM1 to TM7) or only PMI/RI reporting or no PMI/RI reporting is indicated by an RRC message (in the case of TM8 to TM10). If this applies to the present invention, a transmission mode may be defined for each CSI process or NZP CSI-RS resource. That is, a transmission mode or a PUCCH/PUSCH reporting mode may be defined for each CSI process or NZP CSI-RS resource.

Or more options may be set to indicate PMI/RI reporting schemes in the same transmission mode. For example, while only PMI/RI reporting or no PMI/RI reporting is indicated conventionally, PMI/RI reporting or no PMI/RI reporting may be indicated for each CSI process or NZP CSI-RS resource. In this case, a pmi-RI-Report field may be defined for each CSI process or NZP CSI-RS resource or may be extended to 2 or more bits and used as illustrated in [Table 8] below.

TABLE 8

| pmi-RI-Report field (new) | Description |
|---|---|
| 0 | No PMI/RI reporting |
| 1 | PMI/RI reporting for all configured CSI processes |
| 2 | PMI/RI reporting for CSI process set 1 only |
| 3 | PMI/RI reporting for CSI process set 2 only |

[Table 8] illustrates an example in which a plurality of CSI processes configured for a UE are divided into two sets (i.e., set 1 and set 2) and PMI/RI reporting is triggered for each set.

While it has been described in the foregoing embodiments of the present invention that PMI reporting or no PMI reporting is indicated for each antenna partition or each pilot pattern by an RRC message, this should not be construed as limiting the present invention. For example, the system may be configured so that more dynamic control is possible according to a change in the channel state of a UE by including a message indicating PMI reporting or no PMI reporting for each antenna partition or each pilot pattern in physical-layer control information.

Or the fractional beamforming mode information may be configured as information about a linking coefficient feedback configuration or a linking PMI feedback configuration, for each co-located pilot pattern (or antenna port). The information about a linking coefficient feedback configuration or a linking PMI feedback configuration specifies whether a linking coefficient feedback is needed and/or specifies a pilot pattern or an antenna partition for which a linking coefficient feedback is required. However, the need for a linking coefficient feedback according to the mapping relationship between pilot patterns and antenna partitions is not always obviated because corresponding pilots correspond to the uncontrolled space. That is, if pilot patterns are mapped as illustrated in FIG. 21, a feedback of linking coefficient information is not needed not because of the uncontrolled space but because of transmission of the first pilot of each pilot pattern through the same physical antenna.

Or the fractional beamforming mode information may be configured as information about a linking coefficient feedback configuration or a linking PMI feedback configuration, for all co-located pilot patterns (or antenna ports). The information about a linking coefficient feedback configuration or a linking PMI feedback configuration may specify a set of information to be fed back for the total co-located antenna ports or pilot patterns. For example, if two CSI-RS patterns P1 and P2 are configured for a UE, a network may define a mode of reporting an aggregated CQI/RI obtained by a closed-loop scheme as mode 1 (fractional beamforming mode 1), a mode of reporting a PMI for P1 and an aggregated CQI/RI as mode 2 (fractional beamforming mode 2), and a mode of reporting a PMI for P2 and an aggregated CQI/RI as mode 3 (fractional beamforming mode 3). In addition, the network may define a mode of reporting a PMI as linking coefficients and an aggregated CQI/RI as a mode 4 (fractional beamforming mode 4). The network may further define a mode of reporting a PMI for P1, a PMI for P2, a PMI as linking coefficients, and an aggregated CQI/RI as a mode 5 (fractional beamforming mode 5). An aggregated CQI/RI is a CQI/RI for total co-located antenna ports.

Or the fractional beamforming mode information may be configured as a controlled space indicator for each co-located pilot pattern (or antenna port). The controlled space indicator for each co-located pilot pattern (or antenna port) is a message indicating a controlled/uncontrolled space for the antenna partition or pilot pattern. A 1-bit indicator may be defined for each CSI-RS pattern. For example, if a controlled space indicator corresponding to a CSI-RS pattern is logical value 0, this may mean that the CSI-RS pattern belongs to the controlled space and if the controlled space indicator is logical value 1, this may mean that the CSI-RS pattern belongs to the uncontrolled space.

Or the fractional beamforming mode information may be configured as controlled space indicators for linking coefficients or a linking PMI of co-located pilot patterns (or antenna ports). A controlled space indicator is a message indicating whether a linking coefficient linking each pilot pattern or antenna partition corresponds to the controlled space. Information about a reference antenna port or a reference pilot pattern needed to measure each linking coefficient may be additionally provided to the UE. As described above, this information may be defined as a 1-bit indicator for each CSI-RS pattern. If an indicator corresponding to a CSI-RS pattern is logical value 0, this may mean that a linking coefficient is not required and if the indicator is logical value 1, this may mean that a linking coefficient is required. Herein, the reference antenna port or the reference pilot pattern generically refers to an antenna port or a pilot pattern which is a basis by which the UE measures a relative phase and magnitude in measuring a linking coefficient.

3) Information about a precoding scheme for an uncontrolled space may be, for example, a precoding scheme indicator such as a PMI, for each pilot pattern or antenna partition. Particularly, precoding scheme information for some pilot pattern or antenna partition may carry NULL, thus indicating that the pilot pattern corresponds to the controlled space.

Or information about a precoding scheme for an uncontrolled space may be, for example, information about a precoding type for each pilot pattern or antenna partition, such as transmit diversity, Cyclic Delay Diversity (CDD), closed precoding, etc. As described before, precoding type information about some pilot pattern or antenna partition may carry NULL, thus indicating that the pilot pattern corresponds to the controlled space.

Or information about a precoding scheme for an uncontrolled space may be, for example, precoding scheme information or precoding type information about all pilot patterns or antenna partitions. This information is a message indicating a common precoding scheme or precoding type to be, applied to all antenna partitions or all pilot patterns that belong to the uncontrolled space. In this case, information about the uncontrolled space or an indicator indicating the uncontrolled space may be needed additionally, as in 2).

Or information about a precoding scheme for an uncontrolled space may be, for example, information about linking coefficients that link a plurality of antenna partitions (or pilot patterns). That is, coefficients to be used in linking specific antenna partitions or pilot patterns are indicated to the UE.

In summary, the eNB signals, to the UE, 1) information indicating whether fractional beamforming is applied, 2) information indicating a sub-precoder and/or a linking precoder belonging to the controlled space and a sub-precoder and/or a linking precoder belonging to the uncontrolled space, and/or 3) information indicating a precoding type or a precoding scheme used for the sub-precoder and/or the linking precoder belonging to the uncontrolled space.

The control information 1) and the control information 2) may be signaled together. For example, transmission of feedback information supporting a specific beamforming mode may be indicated as in the information 2).

In the LTE system, new transmission modes supporting fractional beamforming may be defined as an exemplary implementation of the control information 1) and/or the control information 2). Each fractional beamforming mode may be defined as a separate transmission mode or as a different parameter in the same transmission mode. Information indicating whether fractional beamforming is activated or information indicating a fractional beamforming mode to be used may be signaled by a higher layer message or a physical layer message. The fractional beamforming activation/deactivation information and/or the fractional beamforming mode information may be signaled to the UE explicitly or implicitly. To signal the fractional beamforming activation/deactivation information and/or the fractional beamforming mode information explicitly, fractional beamforming mode numbers or indexes may be defined and the index of a fractional beamforming mode may be transmitted to the UE by a higher layer message or a physical layer message. To signal the fractional beamforming activation/deactivation information and/or the fractional beamforming mode information implicitly, fractional beamforming activation/deactivation and/or fractional beamforming modes may be mapped to specific feedback modes and a specific feedback mode may be configured for the UE to thereby indicate fractional beamforming activation.

Figure 23:
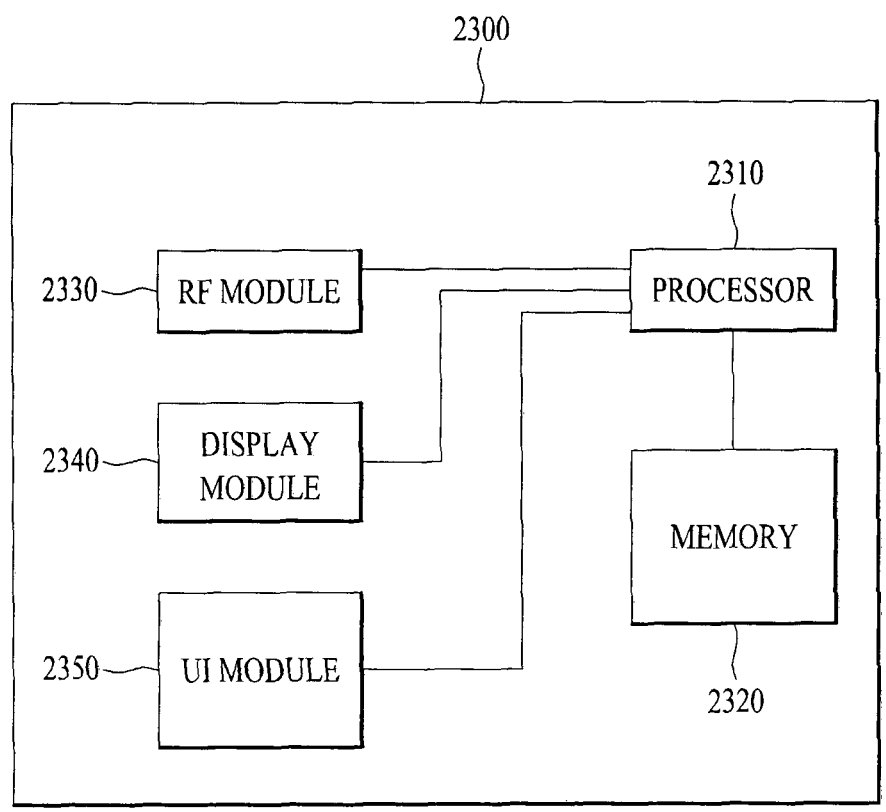
FIG. 23 is a block diagram of a communication apparatus according to an embodiment of the present invention.

FIG. 23 is a block diagram of a communication apparatus according to an embodiment of the present invention.

Referring to FIG. 23, a communication apparatus 2300 includes a processor 2310, a memory 2320, an RF module 2330, a display module 2340, and a User Interface (UI) module 2350.

The communication device 2300 is shown as having the configuration illustrated in FIG. 23, for the convenience of description. Some modules may be added to or omitted from the communication apparatus 2300. In addition, a module of the communication apparatus 2300 may be divided into more modules. The processor 2310 is configured to perform operations according to the embodiments of the present invention described before with reference to the drawings. Specifically, for detailed operations of the processor 2310, the descriptions of FIGS. 1 to 22 may be referred to.

The memory 2320 is connected to the processor 2310 and stores an Operating System (OS), applications, program codes, data, etc. The RF module 2330, which is connected to the processor 2310, upconverts a baseband signal to an RF signal or downconverts an RF signal to a baseband signal. For this purpose, the RF module 2330 performs digital-to-analog conversion, amplification, filtering, and frequency upconversion or performs these processes reversely. The display module 2340 is connected to the processor 2310 and displays various types of information. The display module 2340 may be configured as, not limited to, a known component such as a Liquid Crystal Display (LCD), a Light Emitting Diode (LED) display, and an Organic Light Emitting Diode (OLED) display. The UI module 2350 is connected to the processor 2310 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for providing control information for fractional beamforming in a wireless communication system have been described in the context of a 3GPP LTE system, the present invention is also applicable to many other wireless communication systems. Further, the present invention is related to the massive antenna array, but is applicable to any antenna array structures.

The invention claimed is:

1. A method for performing fractional beamforming using a massive antenna array at a Base Station (BS) in a wireless communication system, the method comprising:
    dividing the massive antenna array into partitions by rows or by columns;
    transmitting control information for the fractional beamforming to a User Equipment (UE);
    receiving feedback information based on the control information from the UE; and
    transmitting a signal to the UE by performing beamforming using sub-precoders for the partitions and a linking precoder that links the partitions,
    wherein the control information includes information related to Channel State Information—Reference Signal (CSI-RS) patterns corresponding to the partitions and at least information related to the partitions, information related to the linking precoder or information indicating whether the partitions belong to a same transmission point,
    wherein at least a first portion of the sub-precoders and the linking precoder is determined based on the feedback information,
    wherein at least a second portion of the sub-precoders and linking precoder is determined randomly,
    wherein, when a value of the information related to CSI-RS patterns is 0, the signal is transmitted using only the sub-precoders, and
    wherein, when the value of the information related to CSI-RS patterns is 1, the signal is the signal is transmitted using the sub-precoders and the linking precoder.

2. The method according to claim 1, wherein the control information further includes information indicating whether the fractional beamforming is performed.

3. The method according to claim 1, wherein:
    the control information further includes information indicating one of a plurality of feedback information configuration modes; and
    the plurality of feedback information configuration modes include a first mode of including information about at least one of the sub-precoders in the feedback information, a second mode of including the information related to the linking precoder in the feedback information, and a third mode of not including the information related to the sub-precoders and the linking precoder in the feedback information.

4. The method according to claim 3, wherein the feedback information further includes a Channel Quality Indicator (CQI) and a Rank Indicator (RI) that are determined based on an aggregate of the pilot patterns.

5. The method according to claim 1, wherein:
    the massive antenna array is divided into the partitions by columns; and
    the sub-precoders are used for vertical beamforming and the linking precoder is used for horizontal beamforming.

6. The method according to claim 1, wherein:
    the massive antenna array is divided into the partitions by rows; and
    the sub-precoders are used for horizontal beamforming and the linking precoder is used for vertical beamforming.

7. A transmission apparatus for performing fractional beamforming using a massive antenna array in a wireless communication system, the transmission apparatus comprising:
    a wireless communication module configured to transmit a signal to and receive a signal from a reception apparatus; and
    a processor configured to:
    divide the massive antenna array into partitions by rows or by columns;
    control the wireless communication module to receive feedback information from the reception apparatus; and
    perform beamforming using sub-precoders for the partitions and a linking precoder that links the partitions,
    wherein the feedback information is generated based on control information previously transmitted to the reception apparatus,
    wherein the control information includes information related to Channel State Information—Reference Signal (CSI-RS) patterns corresponding to the partitions and at least information related to the partitions, information related to the linking precoder or information indicating whether the partitions belong to a same transmission point,
    wherein at least a first portion of the sub-precoders and the linking precoder is determined based on the feedback information,
    wherein at least a second portion of the sub-precoders and linking precoder is determined randomly,
    wherein, when a value of the information related to CSI-RS patterns is 0, the signal is transmitted using only the sub-precoders, and
    wherein, when the value of the information related to CSI-RS patterns is 1, the signal is the signal is transmitted using the sub-precoders and the linking precoder.

8. The transmission apparatus according to claim 7, wherein the control information further includes information indicating whether the fractional beamforming is performed.

9. The transmission apparatus according to claim 7, wherein:
the control information further includes information indicating one of a plurality of feedback information configuration modes; and
the plurality of feedback information configuration modes include a first mode of including information about at least one of the sub-precoders in the feedback information, a second mode of including the information related to the linking precoder in the feedback information, and a third mode of not including the information related to the sub-precoders and the linking precoder in the feedback information.

10. The transmission apparatus according to claim 9, wherein the feedback information further includes a Channel Quality Indicator (CQI) and a Rank Indicator (RI) that are determined based on an aggregate of the pilot patterns.

11. The transmission apparatus according to claim 7, wherein:
the massive antenna array is divided into the partitions by columns; and
the sub-precoders are used for vertical beamforming and the linking precoder is used for horizontal beamforming.

12. The transmission apparatus according to claim 7, wherein:
the massive antenna array is divided into the partitions by rows; and
the sub-precoders are used for horizontal beamforming and the linking precoder is used for vertical beamforming.

* * * * *